United States Patent
Watanabe et al.

(10) Patent No.: US 6,324,893 B1
(45) Date of Patent: Dec. 4, 2001

(54) DIAGNOSTIC APPARATUS AND METHOD FOR ADSORBENT

(75) Inventors: Takashi Watanabe; Koichi Hoshi, both of Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/450,638

(22) Filed: Nov. 29, 1999

(30) Foreign Application Priority Data

Dec. 24, 1998 (JP) .................................................. 10-366309

(51) Int. Cl.$^7$ .................................. F01N 3/08; F01N 3/24
(52) U.S. Cl. ............................ 73/23.32; 73/118.1; 60/277
(58) Field of Search ................... 60/276, 277; 73/118.1, 73/23.31, 23.32

(56) References Cited

U.S. PATENT DOCUMENTS

| | | | | |
|---|---|---|---|---|
| 5,647,203 | * | 7/1997 | Abe et al. ............................ | 60/274 |
| 5,765,369 | * | 6/1998 | Tanaka et al. ........................ | 60/277 |
| 5,873,242 | * | 2/1999 | Morishima et al. .................. | 60/297 |
| 5,887,422 | * | 3/1999 | Abe et al. ............................ | 60/274 |
| 6,112,520 | * | 9/2000 | Kaiho et al. .......................... | 60/303 |
| 6,122,910 | * | 9/2000 | Hoshi et al. .......................... | 60/297 |
| 6,145,304 | * | 11/2000 | Takahashi et al. ................... | 60/277 |
| 6,151,890 | * | 11/2000 | Hoshi ................................... | 60/297 |

* cited by examiner

*Primary Examiner*—George Dombroske
(74) *Attorney, Agent, or Firm*—Oliff & Berridge PLC

(57) ABSTRACT

An adsorbent diagnostic apparatus for an emission control apparatus is able to precisely determine whether an adsorbent for adsorbing unburned gas components has a fault or a deterioration. The diagnostic apparatus has an air-fuel ratio detector that is provided in a portion of the exhaust passage downstream of the adsorbent, and a controller that controls the amount of the previously adsorbed unburned gas component released from the adsorbent to the air-fuel ratio detector. Tic controller determines whether the adsorbent has a fault or a deterioration, based on a detection value of the air-fuel ratio detected by the air-fuel ratio detector, when the amount of the unburned gas component released from the adsorbent remains stable.

24 Claims, 10 Drawing Sheets

DIAGNOSTIC APPARATUS AND METHOD FOR ADSORBENT

INCORPORATION BY REFERENCE

The disclosure of Japanese Patent Application No. HEI 10-366309 filed on Dec. 24, 1998, including the specification, drawings and abstract thereof, is incorporated herein by reference in its entirety.

BACKGROUND OF THE INVENTION

1. Field of Invention

The present invention relates to a diagnostic technology for an emission control apparatus that lessens undesired emissions from an internal combustion engine and, more particularly, to a technology for diagnosing a fault or deterioration of an adsorbent that adsorbs unburned exhaust gas components.

2. Description of Related Art

Many internal combustion engines of, for example, motor vehicles, have in the exhaust system thereof a catalyst device in which precious metals, such as platinum, palladium and the like, are supported as catalysts in order to significantly lessen harmful exhaust gas components, for example, carbon monoxide (CO), nitrogen oxide (NOx), hydrocarbons (HC) and the like, before passing the exhaust into the atmosphere.

A typical catalyst device of the aforementioned kind causes HC and CO present in exhaust gas to react with $O_2$ present in exhaust gas thereby oxidizing HC and CO into $H_2O$ and $CO_2$, and causes NOx present in exhaust gas to react with HC and CO present in exhaust gas thereby reducing NOx into $H_2O$, $CO_2$ and $N_2$.

At the time of startup of an internal combustion engine, the engine air-fuel ratio is set lower than the theoretical air-fuel ratio (that is, shifted to the fuel-rich side) in order to facilitate the startup of the engine. Furthermore, relatively low engine temperature during startup causes unstable combustion. Therefore, unburned gas components, such as unburned hydrocarbons and the like, are discharged in relatively large amounts at the time around engine startup.

The catalyst device of an internal combustion engine becomes able to significantly lessen the harmful exhaust gas components when the temperature of the catalyst device reaches or exceeds a predetermined activation temperature. Therefore, when the activation temperature has not been reached, for example, at the time of cold start of the engine, the catalyst device cannot sufficiently lessen unburned gas components, which are discharged in large amounts in such a situation.

As a countermeasure against the aforementioned problem, an emission control apparatus has been proposed in which an adsorbent that adsorbs unburned gas components when the adsorbent is below a predetermined temperature and that releases the unburned gas components when the adsorbent has reached or exceeded the predetermined temperature, is provided upstream of a catalyst device.

In this emission control apparatus, the adsorbent adsorbs the unburned gas components when the catalyst device has not activated. After the catalyst activates, the catalyst device lessens the unburned gas components desorbed (i.e., released) from the adsorbent and also lessens undesired emissions in the exhaust from the internal combustion engine.

However, if the adsorbing capacity of the adsorbent decreases due to a fault, deterioration or the like, the adsorbent becomes unable to adsorb the entire amount of the unburned gas components present in exhaust gas, and passes portions of the unburned gas components out into the atmosphere, thereby degrading the emission quality.

Therefore, in order to prevent degradation of emissions due to an abnormality of the adsorbent, it is important to detect a fault, deterioration or the like of the adsorbent with high precision.

Japanese Patent Application Laid-Open No. HEI 8-121232 discloses an HC adsorbent deterioration diagnostic apparatus. This deterioration diagnostic apparatus has air-fuel ratio sensors that are provided upstream and downstream of the HC adsorbent for detecting exhaust air-fuel ratios. At a time at which the HC adsorbent should release unburned gas components, the diagnostic apparatus determines whether the HC adsorbent has deteriorated, on the basis of the difference between an output signal of the upstream air-fuel ratio sensor and an output signal of the downstream air-fuel ratio sensor, or a quantity corresponding to the output difference.

This diagnostic technology is based on the finding that if the HC adsorbent is functioning normally, the value of the output signal of the downstream air-fuel ratio sensor shifts from the value of the output signal of the upstream air-fuel ratio sensor to the fuel-rich side by a deviation corresponding to the amount of the unburned gas components desorbed from the HC adsorbent. When the difference between the value of the output signal of the downstream air-fuel ratio sensor and the value of the output signal of the upstream air-fuel ratio sensor becomes less than a predetermined value, it is determined that the adsorption performance or the desorption performance of the HC adsorbent has deteriorated.

However, if the flow of emissions from the internal combustion engine changes so that the amount of unburned gas components desorbed from the adsorbent sharply increases, the air-fuel ratio of exhaust gas flowing downstream of the adsorbent may become an excessively rich ratio that is outside the detection range of the air-fuel ratio sensor. In such a case, precise fault diagnosis may become impossible.

SUMMARY OF THE INVENTION

Accordingly, it is an object of the invention to prevent degradation of emissions due to a fault or deterioration of an adsorbent provided in an emission control apparatus that adsorbs unburned exhaust gas components when the temperature of the adsorbent is below a predetermined temperature and that releases the unburned exhaust gas components when the adsorbent temperature is at or above the predetermined temperature, by providing a technology capable of precisely diagnosing a fault or deterioration of the adsorbent.

One aspect of the invention provides an adsorbent diagnostic apparatus that diagnoses an adsorbent provided in an exhaust passage of an internal combustion engine, the adsorbent adsorbing an unburned gas component in exhaust gas when a temperature of the adsorbent is lower than a predetermined temperature, and the adsorbent releasing the unburned gas component when the temperature of the adsorbent is equal to or higher than the predetermined temperature. The apparatus includes an air-fuel ratio detector provided in a portion of the exhaust passage downstream of the adsorbent. The air-fuel ratio detector detects an air-fuel ratio of exhaust gas flowing in the exhaust passage. Additionally, a controller controls an amount of the unburned gas component supplied from the adsorbent into the portion of the exhaust passage in which the air-fuel ratio detector is disposed. The controller determines whether the adsorbent has at least one of a fault or a deterioration, based on a detection value of the air-fuel ratio detected by the air-fuel ratio detector, when the amount of the unburned gas component supplied remains substantially constant.

In the adsorbent diagnostic apparatus constructed as described above, the controller controls the amount of the unburned gas component flowing from the adsorbent to the air-fuel ratio detector under a condition that the temperature of the adsorbent is equal to or higher than the predetermined temperature and any unburned gas component adsorbed to the adsorbent should be released therefrom. Regardless of the flow of exhaust gas from the internal combustion engine, it is preferable that the amount of the unburned gas component flowing from the adsorbent to the air-fuel ratio detector be stabilized and kept constant.

When the amount of the unburned gas component supplied becomes stable, the controller determines whether the adsorbent has a fault or deterioration, based on the detection value of the air-fuel ratio detected by the first air-fuel ratio detector. Due to the stabilization of the amount of the unburned gas component released from the adsorbent, the air-fuel ratio of exhaust gas downstream of the adsorbent changes only within the detectable range of the air-fuel ratio detector, so that precise diagnosis can be performed.

Another aspect of the invention provides an adsorbent diagnostic apparatus that diagnoses an adsorbent provided in an exhaust passage of an internal combustion engine, the adsorbent adsorbing an unburned gas component in exhaust gas when a temperature of the adsorbent is lower than a predetermined temperature, and the adsorbent releasing the unburned gas component when the temperature of the adsorbent is equal to or higher than the predetermined temperature. The apparatus includes an air-fuel ratio detector provided in a portion of the exhaust passage downstream of the adsorbent. The air-fuel ratio detector detects an air-fuel ratio of exhaust gas flowing in the exhaust passage. Additionally, a controller performs a feedback control of the air-fuel ratio of the internal combustion engine so that the air-fuel ratio of exhaust gas flowing downstream of the adsorbent becomes a predetermined air-fuel ratio, based on a detection value of the air-fuel ratio detected by the air-fuel ratio detector. The controller determines whether the adsorbent has at least one of a fault or a deterioration, based on the detection value of the air-fuel ratio detected by the air-fuel ratio detector, when the adsorbent is supposed to release the unburned gas component and the air-fuel ratio of the internal combustion engine is being feedback-controlled.

In the adsorbent diagnostic apparatus constructed as described above, the controller performs the feedback control to achieve a predetermined air-fuel ratio of exhaust gas downstream of the adsorbent based on the detection value detected by the air-fuel ratio detector under a condition that the temperature of the adsorbent is equal to or higher than a predetermined temperature and any unburned gas component adsorbed to the adsorbent should be released therefrom. In this manner, the air-fuel ratio of exhaust gas downstream of the adsorbent is stabilized. When the air-fuel ratio is thus stabilized, the controller determines whether the adsorbent has a fault or deterioration, based on the detection value of the air-fuel ratio detected by the air-fuel ratio detector.

Therefore, considerable fluctuations of the exhaust air-fuel ratio caused by variations of the operating condition of the internal combustion engine are controlled. Hence, the air-fuel ratio of exhaust gas downstream of the adsorbent changes only within the detectable range of the air-fuel ratio detector, so that precise diagnosis can be performed.

The diagnosis may also be performed by using as a parameter an air-fuel ratio correction amount that is determined in the air-fuel ratio feedback control on the basis of a detected value of the air-fuel ratio. The use of the aforementioned parameter is based on the following finding. When the adsorbent is normal, the amount of the unburned gas component released from the adsorbent brings about a fuel-rich air-fuel ratio of exhaust gas downstream of the adsorbent. Therefore, the air-fuel ratio of exhaust gas discharged from the internal combustion engine is corrected toward the fuel-lean side by the air-fuel ratio feedback control. The amount of this correction, that is, the generally termed lean correction amount, becomes equal to or greater than a predetermined amount provided that the adsorbent is normal.

The adsorbent diagnostic apparatus may further include a second air-fuel ratio detector provided in a portion of the exhaust passage upstream of the adsorbent. In this case, the controller feedback-controls the air-fuel ratio of the internal combustion engine, based on the detection value detected by the first (downstream) air-fuel ratio detector and a detection value detected by the second air-fuel ratio detector.

The controller may also determine whether the adsorbent has at least one of a fault or a deterioration, based on the detection value detected by the first air-fuel ratio detector and a detection value detected by the second air-fuel ratio detector.

For example, when the adsorbent should release the unburned gas component and the air-fuel ratio feedback control is being performed based on the air-fuel ratio detected by the first air-fuel ratio detector, the controller may determine whether the adsorbent has a fault based on the air-fuel ratio detected by the second air-fuel ratio detector.

BRIEF DESCRIPTION OF THE DRAWINGS

The foregoing and further objects, features and advantages of the present invention will become apparent from the following description of preferred embodiments with reference to the accompanying drawings, in which like numerals are used to represent like elements and wherein.

DETAILED DESCRIPTION OF PREFERRED EMBODIMENTS

Preferred embodiments of the adsorbent diagnostic apparatus of the invention will be described with reference to the accompanying drawings.

Figure 1:
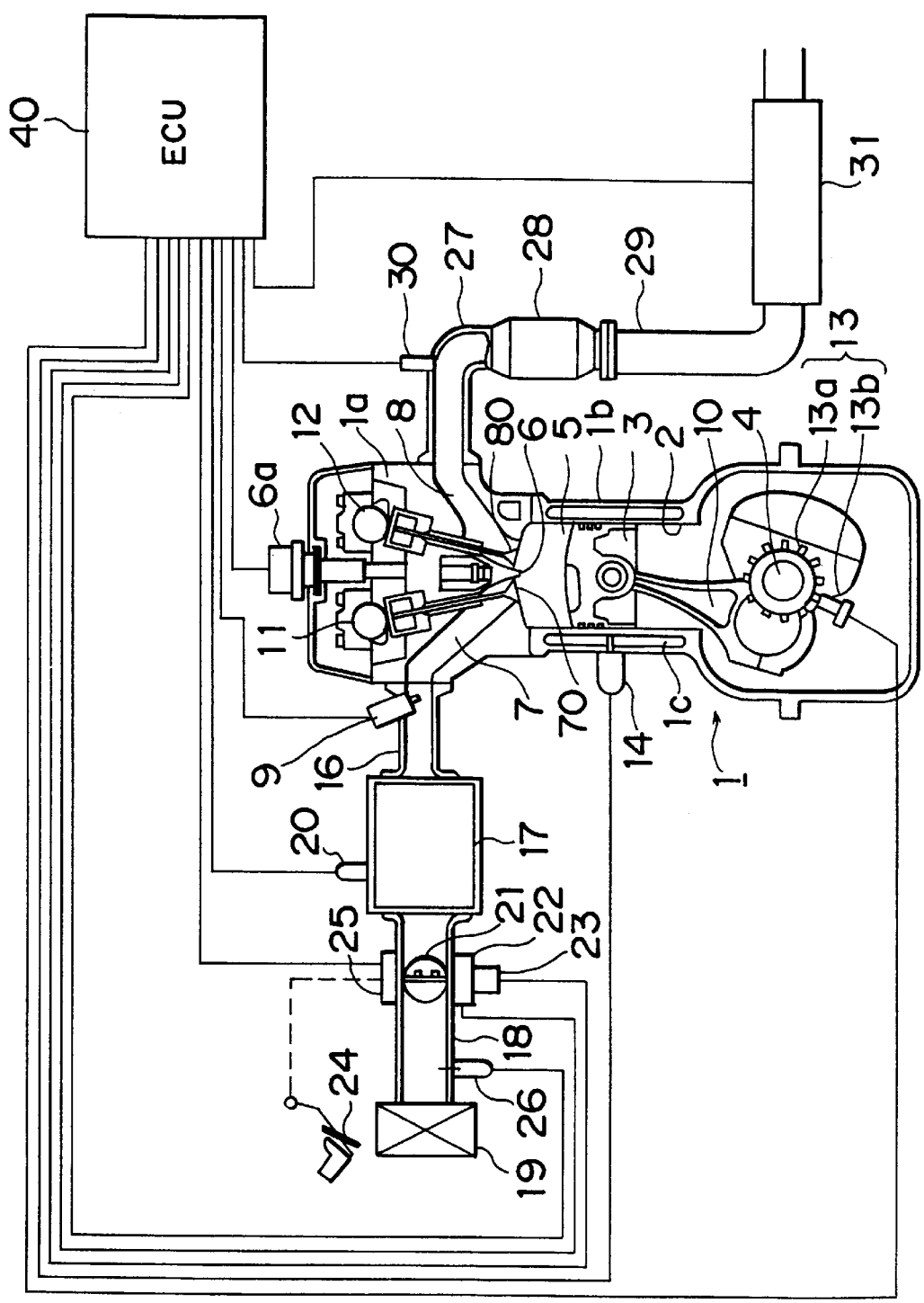
FIG. 1 is a schematic illustration of the construction of an internal combustion engine to which the adsorbent diagnostic apparatus of the invention is applied.

FIG. 1 is a schematic illustration of an internal combustion engine to which an adsorbent diagnostic apparatus according to the invention is applied.

The internal combustion engine 1 is a water-cooled multi-cylinder gasoline engine having a plurality of cylinders 2. The internal combustion engine 1 has a cylinder block 1b in which the cylinders 2 and a cooling water passage 1c are formed, and a cylinder head 1a fixed to an upper portion of the cylinder block 1b.

A crankshaft 4, that is, an engine output shaft, is rotatably supported to the cylinder block 1b. The crankshaft 4 is connected to a piston 3 slidably disposed in each cylinder 2, via a corresponding connecting rod 10.

A combustion chamber 5 is formed above each piston 3, more specifically, defined by a top surface of each piston 3 and the cylinder head 1a. Ignition plugs 6 are connected to the cylinder head 1a in such a manner that the ignition plugs 6 face the corresponding combustion chambers 5. Each ignition plug 6 is connected to an ignition coil 6a that applies a high-voltage drive current to each ignition plug 6.

The cylinder head 1a has two intake ports 7 and two exhaust ports 8 for each cylinder 2. A combustion chamber-side open end of each intake port 7 is opened and closed by an intake valve 70. A combustion chamber-side open end of each exhaust port 8 is closed and opened by an exhaust valve 80. The intake valves 70 and the exhaust valves 80 are supported to the cylinder head 1a in a manner that allows the valves to be moved back and forth.

An intake-side camshaft 11 for driving the intake valves 70 back and forth (in the opening and closing directions) and an exhaust-side camshaft 12 for driving the exhaust valves 80 back and forth (in the opening and closing directions) are rotatably supported to the cylinder head 1a.

The intake-side camshaft 11 and the exhaust-side camshaft 12 are connected to the crankshaft 4 via a timing belt (not shown) in such a manner that turning torque is transmitted from the crankshaft 4 to the intake-side camshaft 11 and to the exhaust-side camshaft 12 by the timing belt.

An intake manifold 16 having branch pipes connecting to the intake ports 7 is mounted to the cylinder head 1a. A fuel injection valve 9 is provided in each branch pipe of the intake manifold 16 in such a manner that a jetting opening of the fuel injection valve 9 faces the corresponding one of the intake ports 7.

The intake manifold 16 is connected to a surge tank 17 that is connected to an air cleaner box 19 via an intake pipe 18. The surge tank 17 is provided with a vacuum sensor 20 that outputs an electric signal corresponding to the pressure in the surge tank 17.

The intake pipe 18 is provided with a throttle valve 21 that adjusts the flow through the intake pipe 18. A portion of the intake pipe 18 extending upstream of the throttle valve 21 is provided with an air flow meter 26 that outputs an electric signal in accordance with the mass of fresh air flowing through the intake pipe 18 (intake air mass).

The throttle valve 21 is provided with an actuator 22 formed by a step motor or the like that opens and closes the throttle valve 21 in accordance with the current applied thereto. The throttle valve 21 is also provided with a throttle position sensor 23 that outputs an electric signal corresponding to the opening of the throttle valve 21.

The throttle valve 21 is connected to an accelerator lever (not shown) that turns in cooperation with an accelerator pedal 24. The accelerator lever is provided with an accelerator position sensor 25 that outputs an electric signal corresponding to the rotational position of the accelerator lever (i.e., the amount of depression of the accelerator pedal 24).

An exhaust manifold 27 having branch pipes connecting to the exhaust ports 8 is mounted to the cylinder head 1a. The exhaust manifold 27 is connected to a three-way catalyst device 28. The three-way catalyst device 28 is formed, e.g., by a ceramic support that is formed from, for example, cordierite into a grating configuration having a plurality of through-holes extending in the flowing direction of exhaust gas, and a catalyst layer coated on a surface of the ceramic support. The catalyst layer is formed by, for example, loading a surface of a porous alumina ($Al_2O_3$) material having many pores, with platinum-rhodium (Pt—Rh)-based precious metal catalysts.

The three-way catalyst device 28 activates when the temperature thereof becomes equal to or higher than a predetermined temperature. If the air-fuel ratio of exhaust gas flowing into the three-way catalyst device 28 is near the theoretical air-fuel ratio, the three-way catalyst device 28 causes hydrocarbons (HC) and carbon monoxide (CO) present in exhaust gas to react with oxygen $O_2$ present in exhaust gas and thereby oxidize HC and CO into $H_2O$ and $CO_2$, and causes NOx present in exhaust gas to react with HC and CO present in exhaust gas and thereby reduce NOx into $H_2O$, $CO_2$ and $N_2$.

The exhaust manifold 27 is provided with an air-fuel ratio sensor 30 that outputs an electric signal corresponding to the air-fuel ratio of exhaust gas flowing into the three-way catalyst device 28. The air-fuel ratio sensor 30 is substantially made up of, for example, a tubular solid electrolyte portion formed by firing zirconia ($ZrO_2$), an outside platinum electrode covering an outside surface of the solid electrolyte portion, and an inside platinum electrode covering an inside surface of the solid electrolyte portion. The air-fuel ratio sensor 30 outputs an electric current proportional to the oxygen concentration in exhaust gas (the concentration of unburned gas components if the air-fuel ratio is in the rich side of the theoretical air-fuel ratio) as oxygen ions migrate upon application of a voltage between the electrodes.

The three-way catalyst device 28 is connected to an exhaust pipe 29. The exhaust pipe 29 is connected at its downstream end to a muffler (not shown). An emission control mechanism 31 is provided between the exhaust pipe 29 and the muffler.

Figure 2:
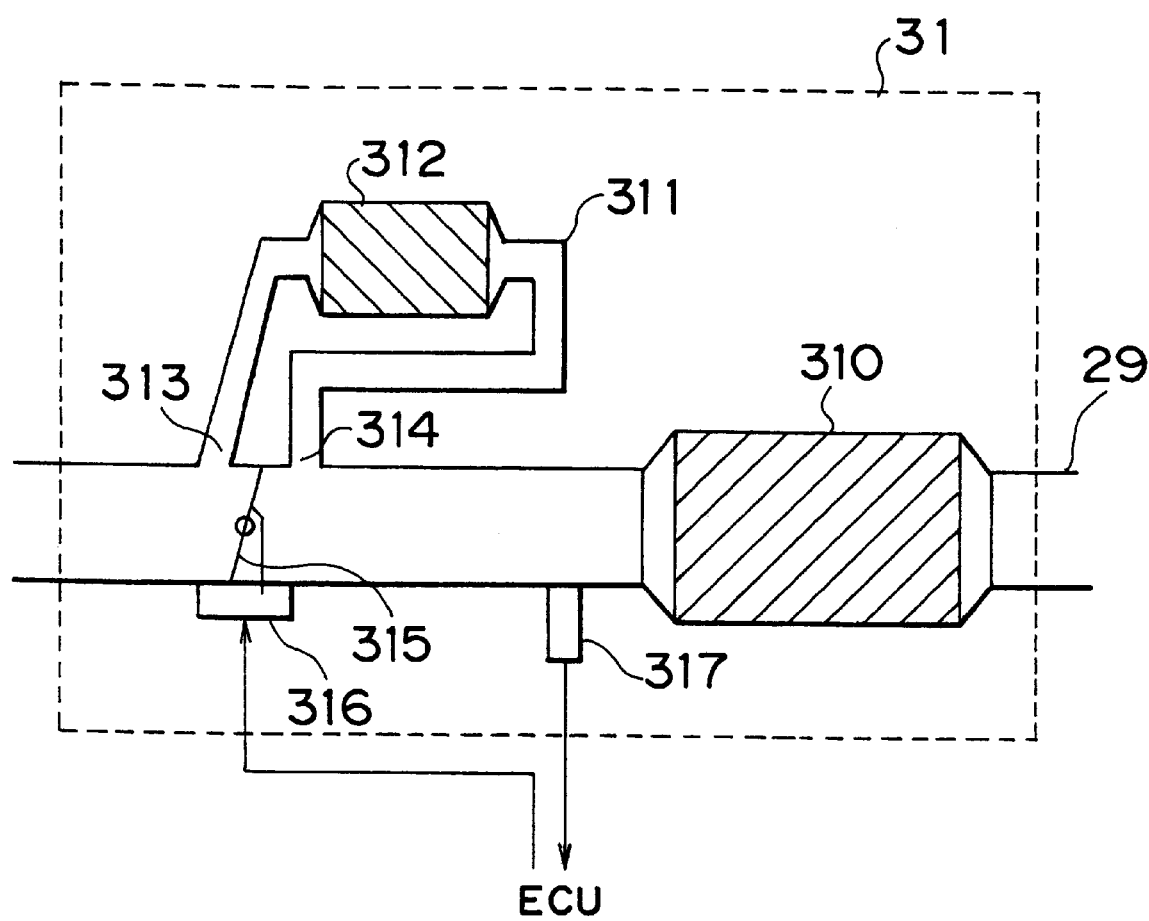
FIG. 2 is an illustration of the construction of an emission control mechanism according to a first embodiment of the invention.

Referring to FIG. 2, the emission control mechanism 31 has a three-way catalyst device 310 that has a larger capacity than the three-way catalyst device 28, and an adsorbent 312 provided in a pathway of a bypass passage 311 bypassing a portion of the exhaust pipe 29 extending upstream of the three-way catalyst device 310. The adsorbent 312 adsorbs unburned gas components in exhaust gas when a predetermined temperature has not been reached by the adsorbent. The adsorbent 312 releases the unburned gas components when the predetermined temperature has been reached or exceeded by the adsorbent. A portion of the exhaust pipe 29 extending between an exhaust gas inlet 313 of the bypass passage 311 and an exhaust gas outlet 314 of the bypass passage 311 is provided with an open-close valve 315 for opening and closing the passage through the exhaust pipe 29. The open-close valve 315 is opened and closed by an actuator 316. An oxygen sensor ($O_2$ sensor) 317 is provided in a portion of the exhaust pipe 29 extending downstream of the exhaust gas outlet 314 of the bypass passage 311 but upstream of the three-way catalyst device 310. The oxygen sensor 317 outputs an electric signal corresponding to the oxygen concentration in exhaust gas flowing into the three-way catalyst device 310, that is, exhaust gas flowing downstream of the adsorbent 312.

The exhaust gas inlet 313 and the exhaust gas outlet 314 of the bypass passage 311 are connected to the exhaust pipe 29 at adjacent positions. In this embodiment, the exhaust gas inlet 313 and the exhaust gas outlet 314 of the bypass passage 311 are arranged at such positions that when the open-close valve 315 is fully opened, the phase difference between the pulsating flow of exhaust gas occurring near the exhaust gas inlet 313 and the pulsating flow of exhaust gas occurring near the exhaust gas outlet 314 becomes small, and the ratio between the flow of exhaust gas through the bypass passage 311 and the flow of exhaust gas through the exhaust pipe 29 becomes a constant ratio.

The oxygen sensor 317 functions as an air-fuel ratio detecting device. The oxygen sensor 317 outputs a reference voltage $V_{REF}$ (e.g., 0.45 V) when the exhaust air-fuel ratio equals the theoretical air-fuel ratio. When the exhaust air-fuel ratio is in the fuel-rich side of the theoretical air-fuel ratio, the oxygen sensor 317 outputs a voltage that is higher than the reference voltage $V_{REF}$. When the exhaust air-fuel ratio is in the fuel-lean side of the theoretical air-fuel ratio, the oxygen sensor 317 outputs a voltage that is lower than the reference voltage $V_{REF}$.

An engine-controlling electronic control unit (ECU) 40 is connected to the internal combustion engine 1. The ECU 40 is connected to various sensors, including the vacuum sensor 20, the throttle position sensor 23, the accelerator position sensor 25, the air flow meter 26, the air-fuel ratio sensor 30, the oxygen sensor 317, a crank position sensor 13 formed by a timing rotor 13a disposed on an end portion of the crankshaft 4 and an electromagnetic pickup 13b disposed on a portion of the cylinder block 1b adjacent to the timing rotor 13a, a water temperature sensor 14 mounted in the cylinder block 1b for detecting the temperature of cooling water flowing through the cooling water passage 1c of the cylinder block 1b, etc., via electric wirings.

The ECU 40 is also connected to the ignition coil 6a, the fuel injection valves 9, the actuator 22, the actuator 316, and the like, via electric wirings. Using output signals of the various sensors as parameters, the ECU 40 determines an operating condition of the internal combustion engine 1, a state (active or inactive) of the three-way catalyst devices 28, 310, and the like. Based on results of such determinations, the ECU 40 controls the ignition coil 6a, the fuel injection valves 9, the actuator 22, and the actuator 316.

Figure 3:
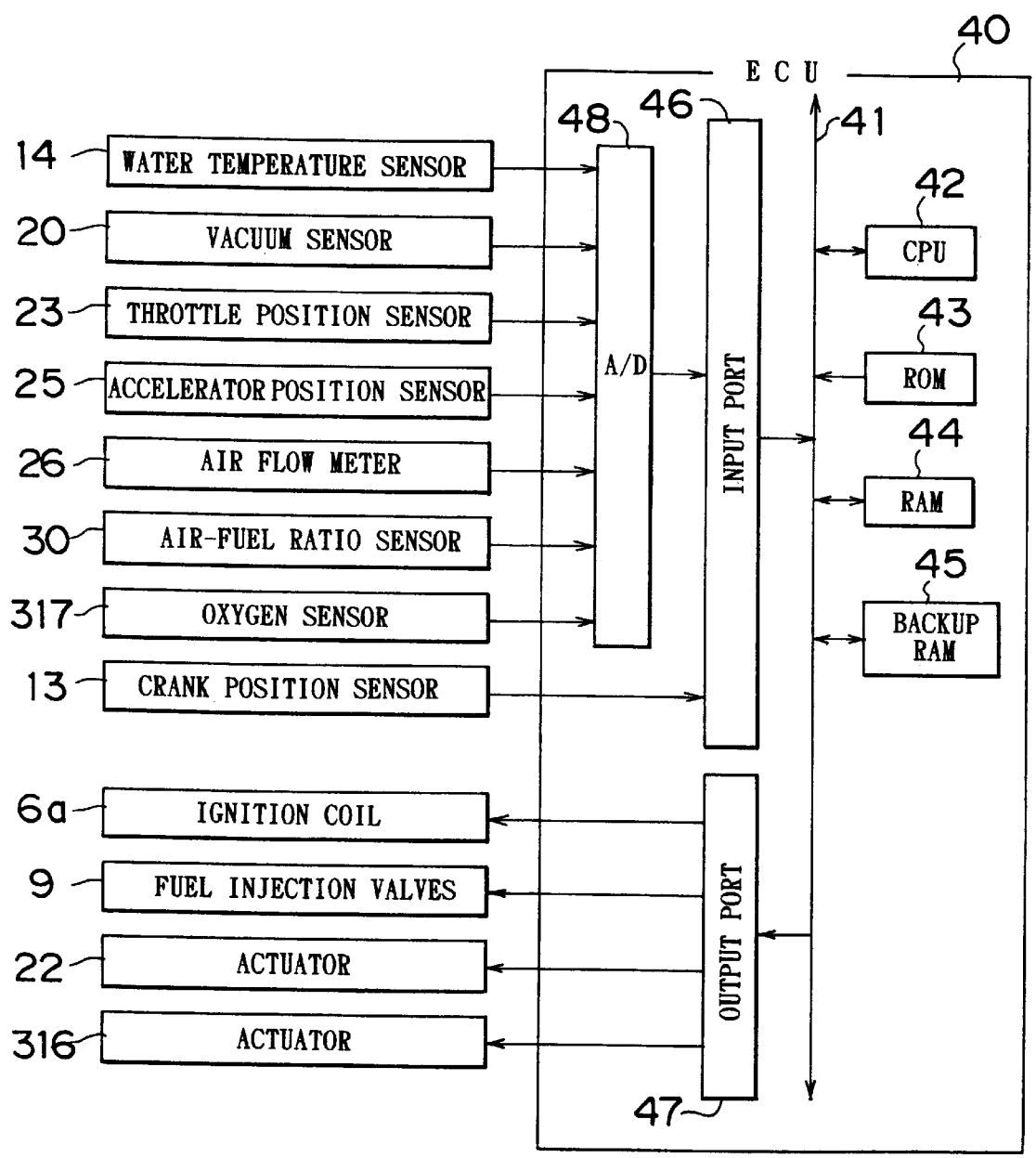
FIG. 3 is a block diagram illustrating the internal construction of an ECU according to the first embodiment.

As shown in FIG. 3, the ECU 40 has a CPU 42, a ROM 43, a RAM 44, a backup RAM 45, an input port 46, and an output port 47 that are interconnected by a bidirectional bus 41. The ECU 40 also includes an A/D converter 48 connected to the input port 46. Signals output from the crank position sensor 13 and the like are input to the input port 46, and sent therefrom to the CPU 42 or to the RAM 44. Signals output from the water temperature sensor 14, the vacuum sensor 20, the throttle position sensor 23 the accelerator position sensor 25, the air flow meter 26, the air-fuel ratio sensor 30 and the oxygen sensor 317 are input to the input port 46 via the A/D converter 48, and then sent to the CPU 42 and to the RAM 44. The output port 47 outputs control signals output from the CPU 42 to the ignition coil 6a, the fuel injection valves 9, the actuator 22 or the actuator 316.

The ROM 43 stores application programs of, for example, a fuel injection amount control routine for determining an amount of fuel to be injected, a fuel injection timing control routine for determining a fuel injection timing, an emission control routine for controlling the open-close valve 315 of the emission control mechanism 31, a diagnostic control routine for executing fault diagnosis of the adsorbent 312, and the like. The ROM 43 also stores various control maps.

The control maps include, for example, a fuel injection amount control map indicating a relationship between the fuel injection amount and the operating condition of the internal combustion engine 1, a fuel injection timing control map indicating a relationship between the fuel injection timing and the operating condition of the internal combustion engine 1, an ignition timing control map indicating a relationship between the ignition timing and the operating condition of the internal combustion engine 1, an activation determination control map indicating a relationship between the temperature of cooling water at the time of startup of the internal combustion engine and the amount of time needed between the startup of the engine and activation of the three-way catalyst device 310 (hereinafter, referred to as "catalytic activation time"), and the like.

The RAM 44 stores output signals from the various sensors, results of operations of the CPU 42, and the like. The results of operations include, for example, an engine revolution speed calculated from the output signal of the crank position sensor 13, and the like. The output signals of the various sensors, the results of operations of the CPU 42, and the like are rewritten as the latest data every time the crank position sensor 13 outputs a signal.

An area for storing the value of a signal output from the water temperature sensor 14 at the time of startup of the internal combustion engine 1 (startup water temperature storing area) is set in the RAM 44. The startup water temperature stored in the startup water temperature storing area is maintained without being updated, during a period between the startup and a stop of the internal combustion engine 1.

Also set in the RAM 44 are a diagnosis end flag (FLAG D) storing area, a diagnostic time count ($K_1$) storing area, a rich/lean side reverse count ($K_2$) storing area, a first rich/lean discrimination flag (FLAG 1) storing area, and a second rich/lean discrimination flag (FLAG 2) storing area.

In the diagnosis end flag (FLAG D) storing area, "1" is set at the time of completion of a diagnostic process described below, and it is reset to "0" at the time of stop of operation of the internal combustion engine 1.

The diagnostic time count ($K_1$) storing area stores the execution duration of a diagnosis.

The rich/lean side reverse count ($K_2$) storing area stores the number of times that the air-fuel ratio reverses between the lean side and the rich side during a diagnosis.

In the first rich/lean discrimination flag (FLAG 1) storing area, data indicating the fuel-rich state is stored when the output voltage ($V_1$) is equal to or higher than the reference voltage ($V_{REF}$). When the output voltage ($V_1$) is lower than the reference voltage ($V_{REF}$), data indicating the fuel-lean state is stored in the area.

In the second rich/lean discrimination flag (FLAG 2) storing area, data indicating the fuel-rich state is stored before the execution of diagnosis starts. After the execution of diagnosis has started, data identical to the data stored in the first rich/lean discrimination flag (FLAG 1) storing area is stored.

The backup RAM 45 is a non-volatile memory that retains data even after the internal combustion engine 1 stops.

The CPU 42 operates following the application programs stored in the ROM 43. More specifically, the CPU 42 executes the fuel injection control, the ignition control, the emission control, and an adsorbent diagnostic control that is an aspect of the invention.

In the fuel injection control, for example, the CPU 42 follows the fuel injection amount control routine to determine a fuel injection amount (TAU) by using the following fuel injection amount determining arithmetic expression:

$$TAU=TP \times FWL \times (FAF+FG) \times [FASE+FAE+FOTP+FDE(D)] \times FFC + TAUV$$

where:
- TP: basic injection amount
- FWL: warm-up increase
- FAF: air-fuel ratio feedback correction factor
- FG: air-fuel ratio learned factor
- FASE: post-startup increase
- FAE: acceleration increase
- FOTP: OTP increase
- FDE(D): deceleration increase (decrease)
- FFC: return-to-fuel-cut correction factor
- TAUV: invalid injection duration The aforementioned basic injection amount (TP), the warm-up increase (FWL), the post-startup increase (FASE), the acceleration increase (FAE), the OTP increase (FOTP), the deceleration increase (FDE(D)), the return-to-fuel-cut correction factor (FFC), the invalid injection duration (TAUV), and the like are factors calculated on the basis of the fuel injection amount control map stored in the ROM 43.

The air-fuel ratio feedback correction factor (FAF) is set to 1.0 when an air-fuel ratio feedback condition is not met. When the air-fuel ratio feedback condition is met, the air-fuel ratio feedback correction factor (FAF) is determined so that the air-fuel ratio of exhaust gas flowing into the three-way catalyst device 310 (i.e., the value of the output signal of the oxygen sensor 317) remains within a catalytic control window.

Examples of the air-fuel ratio feedback control condition include:
- a condition in which the cooling water temperature is equal to or higher than a predetermined temperature;
- a condition in which the internal combustion engine 1 is not started;
- a condition in which the increasing correction of the fuel injection amount after start of the engine is not performed;
- a condition in which the warm-up increasing correction of the fuel injection amount is not performed;
- a condition in which the acceleration increasing correction of the fuel injection amount is not performed;
- a condition in which the OTP increasing correction for preventing, overheating of exhaust system component parts, such as the three-way catalyst devices 28, 310, the air-fuel ratio sensor 30, the oxygen sensor 317, and the like, is not performed; and
- a condition in which the fuel cut control is not performed.

When the air-fuel ratio feedback condition as mentioned above is met, the CPU 42 inputs the value of an output signal of the oxygen sensor 317 via the A/D converter 48. Based on the input value of the output signal and the response delay time of the oxygen sensor 317, the CPU 42 determines whether the actual air-fuel ratio of exhaust gas is in the lean side or the rich side of the theoretical air-fuel ratio.

If it is determined that the actual exhaust air-fuel ratio is in the rich side of the theoretical air-fuel ratio, the CPU 42 determines a value of the air-fuel ratio feedback correction factor (FAF) so as to decrease the fuel injection amount (TAU).

If it is determined that the actual exhaust air-fuel ratio is in the lean side of the theoretical air-fuel ratio, the CPU 42 determines a value of the air-fuel ratio feedback correction factor (FAF) so as to increase the fuel injection amount (TAU).

The air-fuel ratio feedback correction factor (FAF) determined by the aforementioned procedure is subjected to upper and lower guard processes, and then substituted in the aforementioned fuel injection amount determining arithmetic expression.

If an air-fuel ratio sensor (downstream air-fuel ratio sensor) is provided in a portion of the exhaust pipe 29 extending downstream of the three-way catalyst device 310, the CPU 42 may execute a second air-fuel ratio feedback control based on the output signal of the downstream air-fuel ratio sensor, concurrently with the first air-fuel ratio control described above.

The second air-fuel ratio feedback control, for example, compares the value of an output signal of the downstream air-fuel ratio sensor with a predetermined reference voltage to determine whether the air-fuel ratio of exhaust gas passed out of the three-way catalyst device 310 is a lean air-fuel ratio or a rich air-fuel ratio. Based on the determination, the CPU 42 corrects a correction amount of the air-fuel ratio feedback correction factor (FAF), a reference value for the rich/lean determination, and the like that are used in the first air-fuel ratio feedback control. Thereby, the CPU 42 curbs, for example, the degradation of emissions caused by variations in the output characteristic of the air-fuel ratio sensor 30 due to differences among individual sensors, changes in the output characteristic of the air-fuel ratio sensor 30 due to aging, and the like.

Subsequently, for the control of the open-close valve 315, the CPU 42 receives an output signal of the water temperature sensor 14, and calculates a catalytic activation time based on the output signal of the water temperature sensor 14 and the activation determination control map stored in the ROM 43, when the internal combustion engine 1 is started.

The CPU 42 then outputs a control signal to the actuator 316 so as to maintain a completely closed state of the open-close valve 315 (a non-conductive state of the exhaust pipe 29) as shown in FIG. 2 until the catalytic activation time elapses, that is, while the three-way catalyst device 310 is in a not-activated state.

In this situation, the entire amount of exhaust gas discharged from the internal combustion engine 1 is led to the bypass passage 311 so as to pass through the adsorbent 312 before flowing into the three-way catalyst device 310. Therefore, unburned gas components contained in exhaust gas are not emitted into the atmosphere, but are adsorbed to the adsorbent 312.

After the catalytic activation time elapses, that is, after the three-way catalyst device 310 activates, the CPU 42 outputs a control signal to the actuator 316 so as to establish a fully open state of the open-close valve 315 (a conductive state of the exhaust pipe 29).

In this situation, both the exhaust pipe 29 and the bypass passage 311 are in the conductive state, so that exhaust gas discharged from the internal combustion engine 1 flows parallelly through the bypass passage 311 and the exhaust pipe 29 before flowing into the three-way catalyst device 310.

Since the exhaust gas inlet 313 and the exhaust gas outlet 314 of the bypass passage 311 are adjacent to each other, the difference between the exhaust gas pressure near the exhaust gas inlet 313 and the exhaust gas pressure near the exhaust gas outlet 314 is small, and the phase difference between the pulsating flow of exhaust gas through a portion of the exhaust pipe 29 located near the exhaust gas inlet 313 and the pulsating flow of exhaust gas through a portion of the exhaust pipe 29 located near the exhaust gas outlet 314 is small. Therefore, of the entire amount of exhaust gas discharged from the internal combustion engine 1, only a very small portion flows into the three-way catalyst device 310 via the bypass passage 311. The major portion of the exhaust gas discharged from the engine 1 flows into the three-way catalyst device 310 via the exhaust pipe 29 without passing through the bypass passage 311.

When the flow through the bypass passage 311 is very small, the flow of exhaust gas through the adsorbent 312 correspondingly becomes very small, so that the temperature increasing rate of the adsorbent 312 becomes small or gradual. Therefore, the unburned gas components adsorbed to the adsorbent 312 are gradually released therefrom little by little.

As a result, the amount of unburned gas components introduced from the bypass passage 311 into a portion of the exhaust pipe 29 upstream of the three-way catalyst device 310 becomes stable at a very small amount, so that the air-fuel ratio of exhaust gas flowing into the three-way catalyst device 310 will not excessively change (to an excessively rich ratio). Therefore, the air-fuel ratio of exhaust gas flowing into the three-way catalyst device 310 will not considerably deviate from a range of air-fuel ratio that allows the three-way catalyst device 310 to significantly lessen HC, CO and NOx.

In this manner, the amount of unburned gas components is made stable by the emission control mechanism 31.

In order to execute the adsorbent diagnostic control, the CPU 42 reads, from the startup water temperature storing area of the RAM 44, the value of the signal output by the water temperature sensor 14 (startup cooling water temperature $THW_{ST}$) at the time of startup of the internal combustion engine 1. The CPU 42 then determines whether the startup cooling water temperature $THW_{ST}$ is equal to or lower than a predetermined temperature (i.e., a cooling water temperature at which the three-way catalyst device 310 is supposed to activate), that is, whether the startup of the internal combustion engine 1 was a cold start or a warm start.

When the startup cooling water temperature $THW_{ST}$ is lower than the predetermined temperature and it is determined that the startup of the internal combustion engine 1 was a cold start, it is assumed that because the three-way catalyst device 310 was not activated at the time of startup of the internal combustion engine 1, the passage switching control of the emission control mechanism 31 was executed (to close valve 315) so that unburned exhaust gas components were adsorbed to the adsorbent 312 during a period between the startup of the internal combustion engine 1 and activation of the three-way catalyst device 310. Therefore, the CPU 42 assumes that unburned gas components have been adsorbed to the adsorbent 312.

When the startup cooling water temperature $THW_{ST}$ is equal to or higher than the predetermined temperature and it is determined that the startup of the internal combustion engine 1 was a warm start, it is assumed that because the three-way catalyst device 310 was already activated at the time of startup of the internal combustion engine 1, the passage switching control for causing unburned exhaust gas components to adsorb to the adsorbent 312 was not executed after the startup of the internal combustion engine 1. Therefore, the CPU 42 assumes that unburned gas components have not been adsorbed to the adsorbent 312.

After it is determined that the startup of the internal combustion engine 1 was a cold start because the startup cooling water temperature $THW_{ST}$ is equal to or lower than the predetermined temperature, the CPU 42 diagnoses the adsorbent 312 based on the value of an output signal of the oxygen sensor 317 at a timing at which the adsorbent 312 should be releasing unburned gas components and at which the above-described air-fuel ratio feedback control is being executed.

Figure 4:
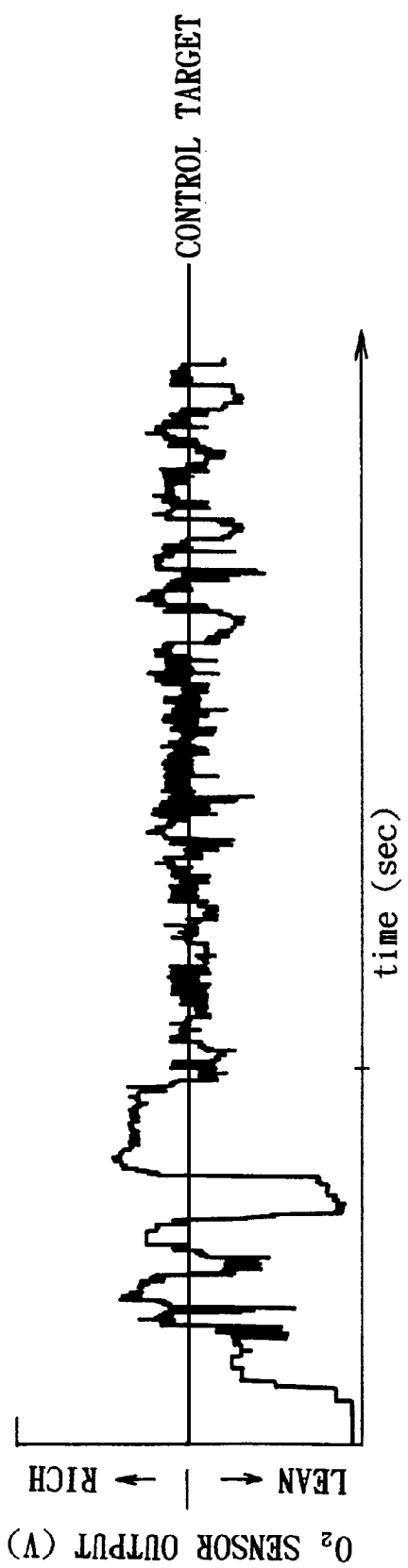
FIG. 4 is a diagram illustrating an example of the signal output by an oxygen sensor when an adsorbent is normal.

Since the emission control mechanism 31 operates so that the amount of unburned gas components desorbed from the adsorbent 312 when the adsorbent 312 is normal becomes a very small amount, the value of a signal output by the oxygen sensor 317 during execution of the air-fuel ratio feedback control repeats reversing or reciprocating between the rich side and the lean side of a target air-fuel ratio of the air-fuel ratio feedback control, at high repetition frequencies, as indicated in FIG. 4.

That is, when the adsorbent 312 is normal, the value of the output signal of the oxygen sensor 317 exhibits a waveform having relatively short rich/lean reversion periods and relatively small rich/lean amplitudes.

Figure 5:
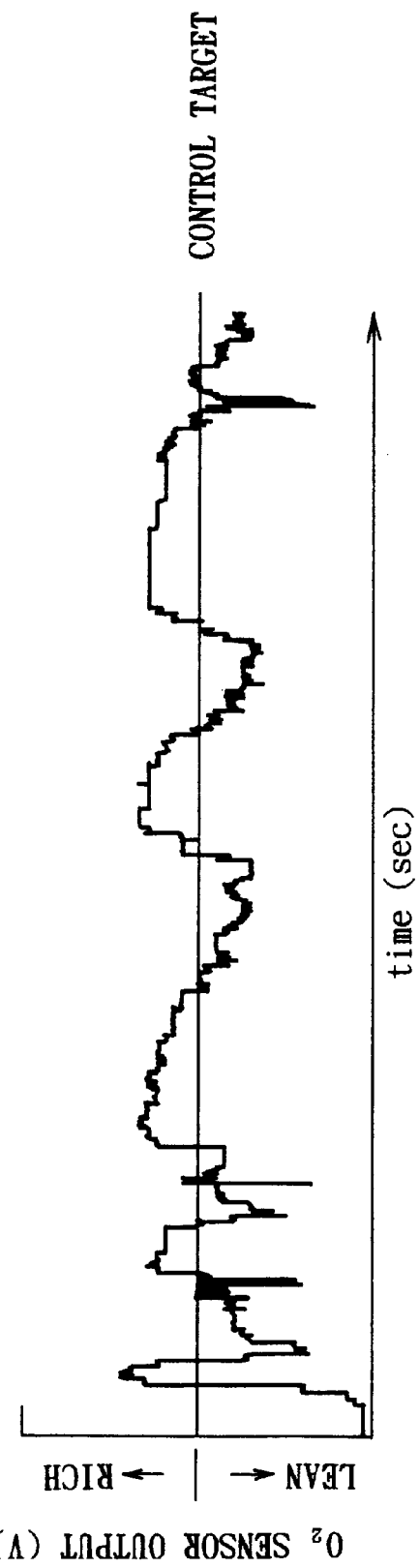
FIG. 5 is a diagram illustrating an example of the signal output by the oxygen sensor when the adsorbent is abnormal.

If the adsorbent 312 fails to normally adsorb unburned gas components during a cold state, or if the adsorbent 312 fails to normally release unburned gas components during a desorption process, unburned gas components will not be desorbed from the adsorbent 312 even when the adsorbent 312 is in such a state that the adsorbent 312 is supposed to release unburned gas components. Therefore, the value of the output signal of the oxygen sensor 317 relatively gradually repeats reversing or reciprocating between the rich side and the lean side of the target air-fuel ratio of the air-fuel ratio feedback control in accordance with the oxygen storing capacity (OSC) of the three-way catalyst device 28 disposed upstream of the adsorbent 312, as indicated in FIG. 5.

That is, when the adsorbent 312 has an abnormality, the value of the output signal of the oxygen sensor 317 exhibits an output characteristic in accordance with changes in the oxygen storing capacity (OSC) of the three-way catalyst device 28 disposed upstream of the adsorbent 312, so that the output signal value exhibits a waveform in which the rich/lean reversion period is relatively long and the rich/lean amplitude is relatively large.

Therefore, in a case where the adsorbent 312 is in the state in which the adsorbent 312 should be releasing unburned gas components and where the air-fuel ratio feedback control is being executed, the CPU 42 monitors the value of the output signal of the oxygen sensor 317 for a predetermined length of time. If the period of rich/lean reversions of the air-fuel ratio occurring during the predetermined time is greater than a predetermined criterion, or if the amplitude of rich/lean reciprocations or oscillations of the air-fuel ratio during the predetermined time is greater than a predetermined criterion, the CPU 42 determines that the adsorbent 312 has an abnormality.

Therefore, by executing application programs stored in the ROM 43, the CPU 42 realizes a diagnostic device in accordance with an aspect of the invention.

A diagnosis according to this embodiment will be described below.

Figure 6:
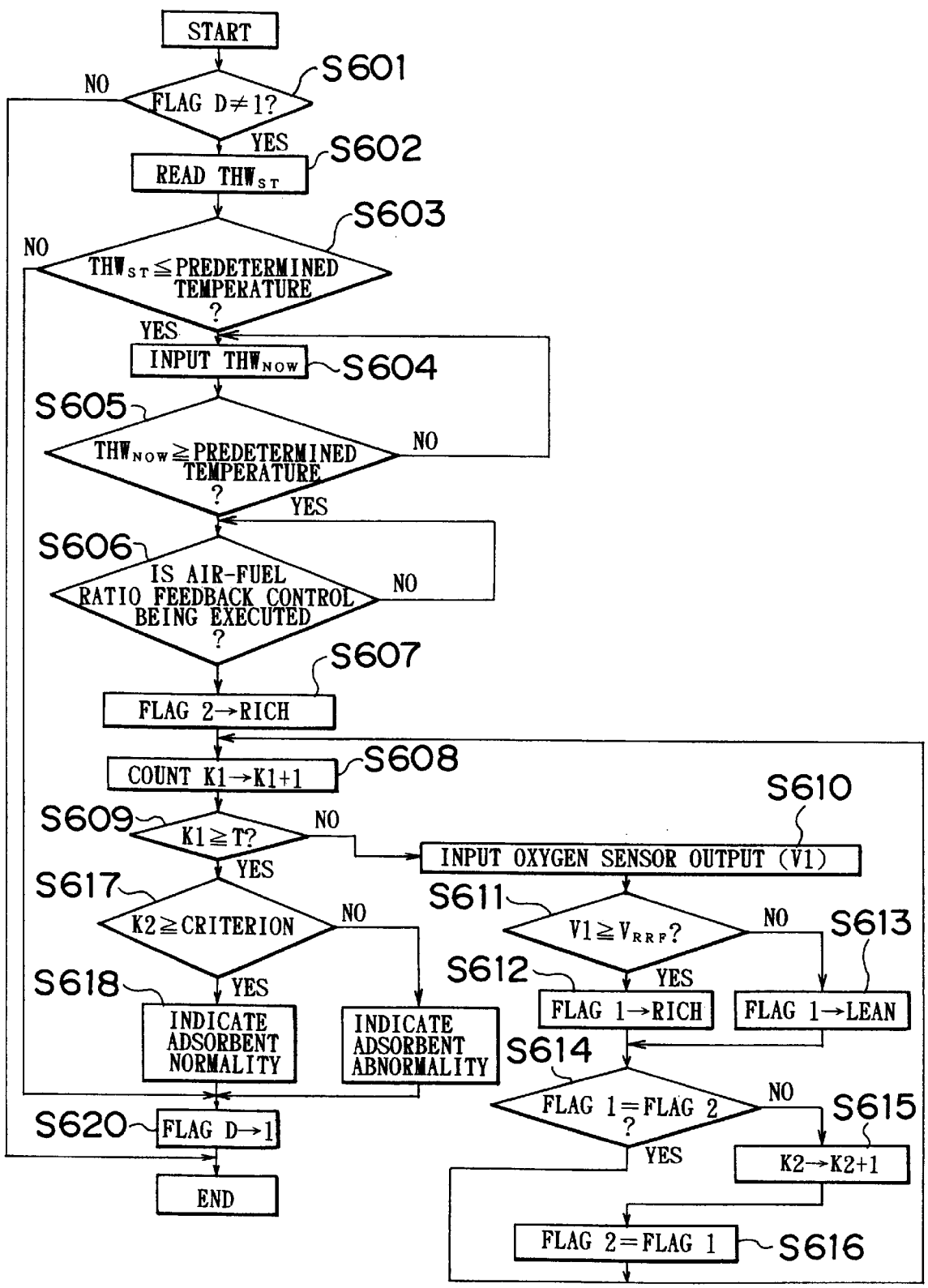
FIG. 6 is a flowchart illustrating a diagnostic control routine according to the first embodiment.

To diagnose the adsorbent 312, the CPU 42 executes a diagnostic control routine as illustrated in FIG. 6. The diagnostic control routine is repeatedly executed at every predetermined time during operation of the internal combustion engine 1.

In the diagnostic control routine, the CPU 42 determines in step S601 whether "1" has been stored in the diagnosis end flag (FLAG D) storing area of the RAM 44, that is, whether the diagnosis of the adsorbent 312 has been completed. If it is determined that FLAG D=1, the CPU 42 ends the execution of the routine, assuming that the diagnosis of the adsorbent 312 has already finished. If it is determined that FLAG D≠1 in step S601, the CPU 42 assumes that the diagnosis of the adsorbent 312 has not finished, and proceeds to step S602.

In step S602, the CPU 42 reads the startup cooling water temperature $THW_{ST}$ from the RAM 44. Subsequently in step S603, the CPU 42 determines whether the startup cooling water temperature $THW_{ST}$ read out in step S602 is equal to or lower than a predetermined temperature, that is, whether the startup of the internal combustion engine 1 was a cold start or a warm start.

If it is determined in step S603 that the startup cooling water temperature $THW_{ST}$ is higher than the predetermined temperature, the CPU 42 proceeds to step S620, and assumes that the internal combustion engine 1 was warm-started and, therefore, the three-way catalyst device 310 was in the active state at the time of startup, so that the passage switching control for causing unburned exhaust gas components to adsorb to the adsorbent 312 (i.e., a control of causing the entire amount of exhaust gas to flow through the bypass passage 311 by maintaining the completely closed state of the open-close valve 315 in the emission control mechanism 31) has not been performed, that is, unburned gas components have not been adsorbed to the adsorbent 312. In step S620, the CPU 42 stores "1" into the diagnosis end flag (FLAG D) storing area of the RAM 44. Subsequently, the CPU 42 ends the execution of the routine.

Conversely, if it is determined in step S603 that the startup cooling water temperature $THW_{SR}$ is equal to or lower than the predetermined temperature, the CPU 42 proceeds to step S604, and assumes that the internal combustion engine 1 was cold-started and, therefore, the three-way catalyst device 310 was in the inactive state at the time of startup, so that the passage switching control of the emission control mechanism 31 for causing unburned gas components to adsorb to the adsorbent 312 (i.e., the control of causing the entire amount of exhaust gas to flow through the bypass passage 311 by maintaining the completely closed state of the open-close valve 315 in the emission control mechanism 31) was performed during the period between the startup of the internal combustion engine 1 and the activation of the three-way catalyst device 310, that is, unburned gas components have been adsorbed to the adsorbent 312. In steps S604 and S605, the CPU 42 determines whether the adsorbent 312 is in a state in which the adsorbent 312 is supposed to be releasing unburned gas components, as described below.

The adsorbent 312 is formed mainly from zeolite, and has the following characteristic. That is, when below a predetermined temperature, the adsorbent 312 adsorbs unburned exhaust gas components. When the predetermined temperature is reached or exceeded, the adsorbent 312 releases unburned gas components therefrom. Therefore, it is possible to determine whether the adsorbent 312 is in a state in which the adsorbent 312 is supposed to be releasing unburned gas components by determining whether the temperature of the adsorbent 312 is equal to or higher than the predetermined temperature (hereinafter, referred to as "desorption temperature").

Various methods may be employed to determine whether the adsorbent 312 is equal to or higher than a desorption temperature. Examples of the methods include: (1) a method in which the temperature of the adsorbent 312 is directly detected, (2) a method in which a temperature of the adsorbent 312 is estimated from a total amount of exhaust gas that has passed through the adsorbent 312 since the startup of the internal combustion engine 1 up to the present moment, (3) a method in which a temperature of the adsorbent 312 is estimated from the temperature of cooling water of the internal combustion engine 1, and the like. This embodiment will be described in conjunction with the method in which a temperature of the adsorbent 312 is estimated from the temperature of cooling water.

According to the aforementioned method, the CPU 42 inputs the present value ($THW_{NOW}$) of the output signal of the water temperature sensor 14 in step S604. Subsequently in step S605, the CPU 42 determines whether the present cooling water temperature $THW_{NOW}$ is equal to or higher than a predetermined temperature, thereby estimating whether the temperature of the adsorbent 312 is equal to or higher than the desorption temperature. If it is determined in step S605 that the present cooling water temperature $THW_{NOW}$ is lower than the predetermined temperature, the CPU 42 estimates that the temperature of the adsorbent 312 is lower than the desorption temperature, and repeats the processing of step S605 until the present cooling water temperature $THW_{NOW}$ reaches or exceeds the predetermined temperature. When it is determined in step S605 that the present cooling water temperature $THW_{NOW}$ is equal to or higher than the predetermined temperature, the CPU 42 estimates that the temperature of the adsorbent 312 is equal to or higher than the desorption temperature, and proceeds to step S606.

In step S606, the CPU 42 determines whether the air-fuel ratio feedback control is being performed. If it is determined in step S606 that the air-fuel ratio feedback control is not being performed, the CPU 42 repeats the processing of step S606 while performing an open-loop control using a fuel injection amount based on operating conditions (intake air flow, engine revolution speed, etc.) of the internal combustion engine 1 until the air-fuel ratio feedback control is performed.

When it is determined in step S606 that the air-fuel ratio feedback control is being performed, the CPU 42 proceeds to step S607. In step s607, the CPU 42 stores tentative data indicating the fuel-rich state into the second rich/lean discrimination flag (FLAG 2) storing area of the RAM 44.

Subsequently in step S608, the CPU 42 increments the count $K_1$ stored in the diagnostic time count ($K_1$) storing area of the RAM 44, by "1".

Subsequently in step S609, the CPU 42 determines whether the count $K_1$ incremented in step S608 has reached or exceeded a predetermined diagnostic time T (fixed value).

If it is determined in step S609 that the count $K_1$ is less than the predetermined diagnostic time T, the CPU 42 proceeds to step S610, in which the CPU 42 receives an output voltage ($V_1$) of the oxygen sensor 317.

Subsequently in step S611, the CPU 42 determines whether the output voltage ($V_1$) of the oxygen sensor 317 input in step S610 is equal to or higher than the reference voltage ($V_{REF}$), that is, whether the air-fuel ratio of exhaust gas flowing through a portion of the exhaust pipe 29 downstream of the adsorbent 312 is a rich air-fuel ratio.

If it is determined in step S611 that the output voltage ($V_1$) is equal to or higher than the reference voltage ($V_{REF}$), the CPU 42 assumes that the air-fuel ratio of exhaust gas flowing through the portion of the exhaust pipe 29 downstream of the adsorbent 312 is a rich air-fuel ratio, and proceeds to step S612. In step S612, the CPU 42 stores data indicating the fuel-rich state into the first rich/lean discrimination flag (FLAG 1) storing area of the RAM 44.

Conversely, if it is determined in step S611 that the output voltage ($V_1$) is lower than the reference voltage ($V_{REF}$), the CPU 42 assumes that the air-fuel ratio of exhaust gas flowing through the portion of the exhaust pipe 29 downstream of the adsorbent 312 is a lean air-fuel ratio, and proceeds to step S613. In step S613, the CPU 42 stores data indicating the fuel-lean state into the first rich/lean discrimination flag (FLAG 1) storing area of the RAM 44.

After executing step S612 or S613, the CPU 42 proceeds to step S614, in which the CPU 42 determines whether the data stored in the first rich/lean discrimination flag (FLAG 1) storing area equals the data stored in the second rich/lean discrimination flag (FLAG 2) storing area.

If it is determined in step S614 that the data stored in the two areas are not equal, the CPU 42 proceeds to step S615, in which the CPU 42 increments the count $K_2$ stored in the rich/lean side reverse count ($K_2$) storing area of the RAM 44, by "1". Subsequently in step S616, the CPU 42 stores data equal to the data stored in the first rich/lean discrimination flag (FLAG 1) storing area into the second rich/lean discrimination flag (FLAG 2) storing area of the RAM 44.

Conversely, if it is determined in step S614 that the data stored in the two areas are equal, or after the processing in step S615 is executed, the CPU 42 returns to step S608, in which the CPU 42 increments the count $K_1$ stored in the diagnostic time count ($K_1$) storing area of the RAM 44, by "1".

If it is determined in step S609 that the count $K_1$ incremented in step S608 is equal to or greater than the predetermined diagnostic time T, the CPU 42 proceeds to step S617. In step S617, the CPU 42 determines whether the count $K_1$ stored in the rich/lean side reverse count ($K_2$) storing area is equal to or greater than a criterion value, that is, whether the number of times of rich/lean reversion in the predetermined diagnostic time T is equal to or greater than a criterion value.

If it is determined in step S617 that the count $K_2$ stored in the rich/lean side reverse count ($K_2$) storing area is equal to or greater than the criterion value, it is assumed that the rich/lean reversion period is shorter than a predetermined period because the number of times of rich/lean reversion is equal to or greater than the predetermined number. In step S618, therefore, the CPU 42 stores data indicating the adsorbent 312 is normal into the backup RAM 45 or the like.

Conversely, if it is determined in step S617 that the count $K_2$ stored in the rich/lean side reverse count ($K_2$) storing area is less than the criterion value, it is assumed that the rich/lean reversion period is longer than the predetermined period or the amount of unburned gas components desorbed is less than a normal value because the number of times of rich/lean reversion in the predetermined diagnostic time T is less than the predetermined number. In step S619, therefore, the CPU 42 stores data indicating that the adsorbent 312 is abnormal into a predetermined area in the backup RAM 45.

It is also possible to provide an alarm lamp that turns on when it is determined that the adsorbent 312 is abnormal in a passenger compartment of a vehicle.

After executing step S618 or S619, the CPU 42 proceeds to step S620, in which the CPU 42 sets "1" in the diagnosis end flag (FLAG D) storing area of the RAM 44. Subsequently, the CPU 42 ends the execution of the routine.

In this embodiment, the amount of unburned gas components desorbed from the adsorbent 312 becomes stable at a very small amount even in a case where the flow of exhaust gas from the internal combustion engine 1 changes due to changes of the operating condition of the internal combustion engine 1 during execution of the diagnosis of the adsorbent 312. Therefore, the embodiment prevents unburned gas components from being desorbed in large amounts in unison (at one time), and prevents the air-fuel ratio of exhaust gas from considerably deviating from the detection range of the oxygen sensor 317. Hence, the embodiment enables high-precision diagnosis.

Although in the foregoing embodiment, the diagnosis of the adsorbent 312 is performed on the basis of the period of rich/lean reversions of the output voltage of the oxygen sensor 317, the diagnosis may also be performed on the basis of the magnitude of amplitude of oscillatory variation of the output voltage of the oxygen sensor 317.

Furthermore, in order to further stabilize the amount of unburned gas components desorbed from the adsorbent 312 during execution of the diagnosis of the adsorbent 312, it is also possible to provide pressure sensors at the exhaust gas inlet 313 and the exhaust gas outlet 314 of the bypass passage 311 and to adjust the opening of the open-close valve 315 on the basis of output signals of the pressure sensors in such a manner that the ratio between the flow of exhaust gas through the bypass passage 311 and the flow of exhaust gas through the exhaust pipe 29 remains constant regardless of variations of the operating condition. It is also possible to adjust the opening of the open-close valve 315 so that the difference between pressures detected by the pressure sensors remains constant regardless of variations of the operating condition.

A second embodiment of the adsorbent diagnostic apparatus of the invention will be described with reference to FIGS. 7 to 11. Features distinguishing the second embodiment from the first embodiment will mainly be described below, and features comparable to those of the first embodiment will not be described again.

Figure 7:
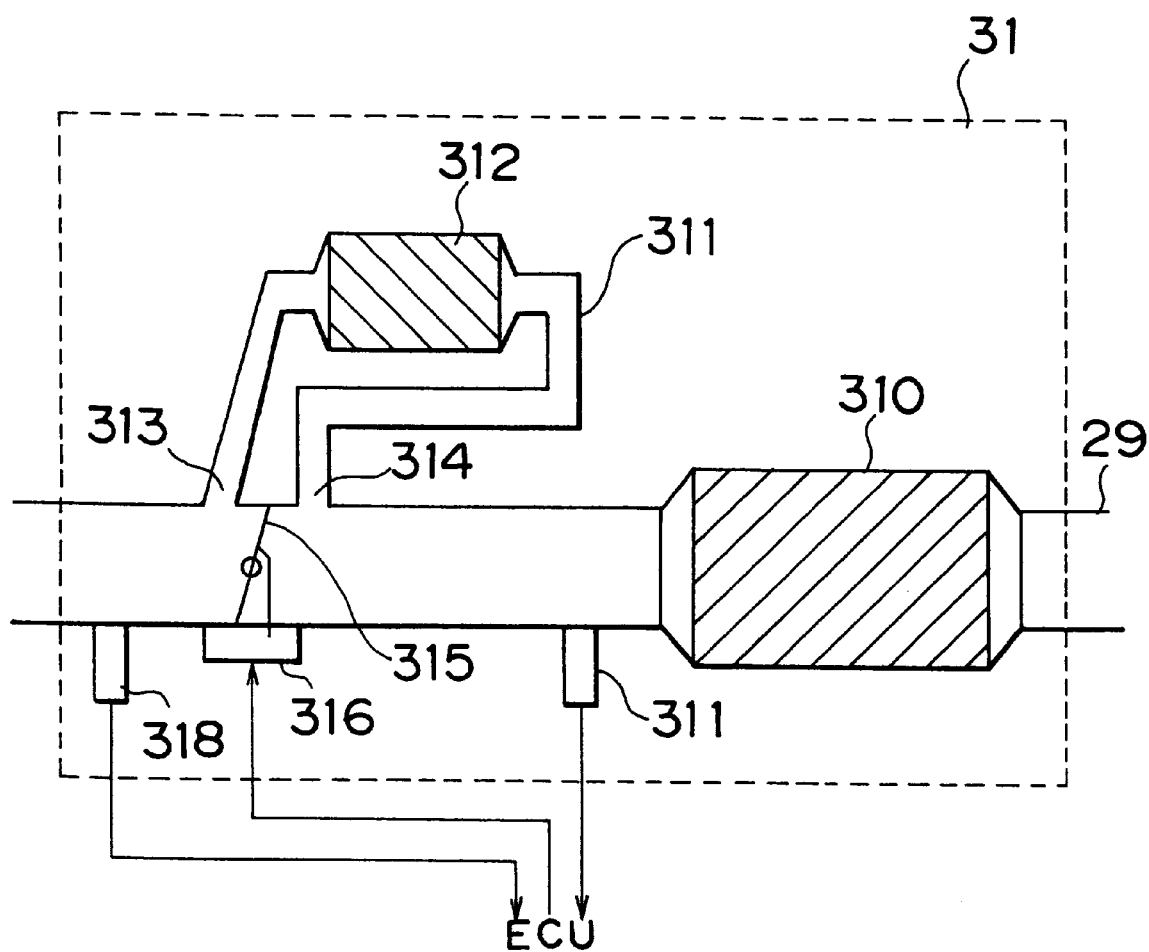
FIG. 7 is an illustration of the construction of an emission control mechanism according to a second embodiment of the invention.

FIG. 7 illustrates the construction of an emission control mechanism 31 according to the second embodiment. In the emission control mechanism 31 in the second embodiment, an oxygen sensor 318 is provided at a site in an exhaust pipe 29 located upstream of an exhaust gas inlet 313 of a bypass passage 311 in which an adsorbent 312 is disposed. Hereinafter, the oxygen sensor 317 will be referred to as "first oxygen sensor 317", and the oxygen sensor 318 will be referred to as "second oxygen sensor 318".

Figure 8:
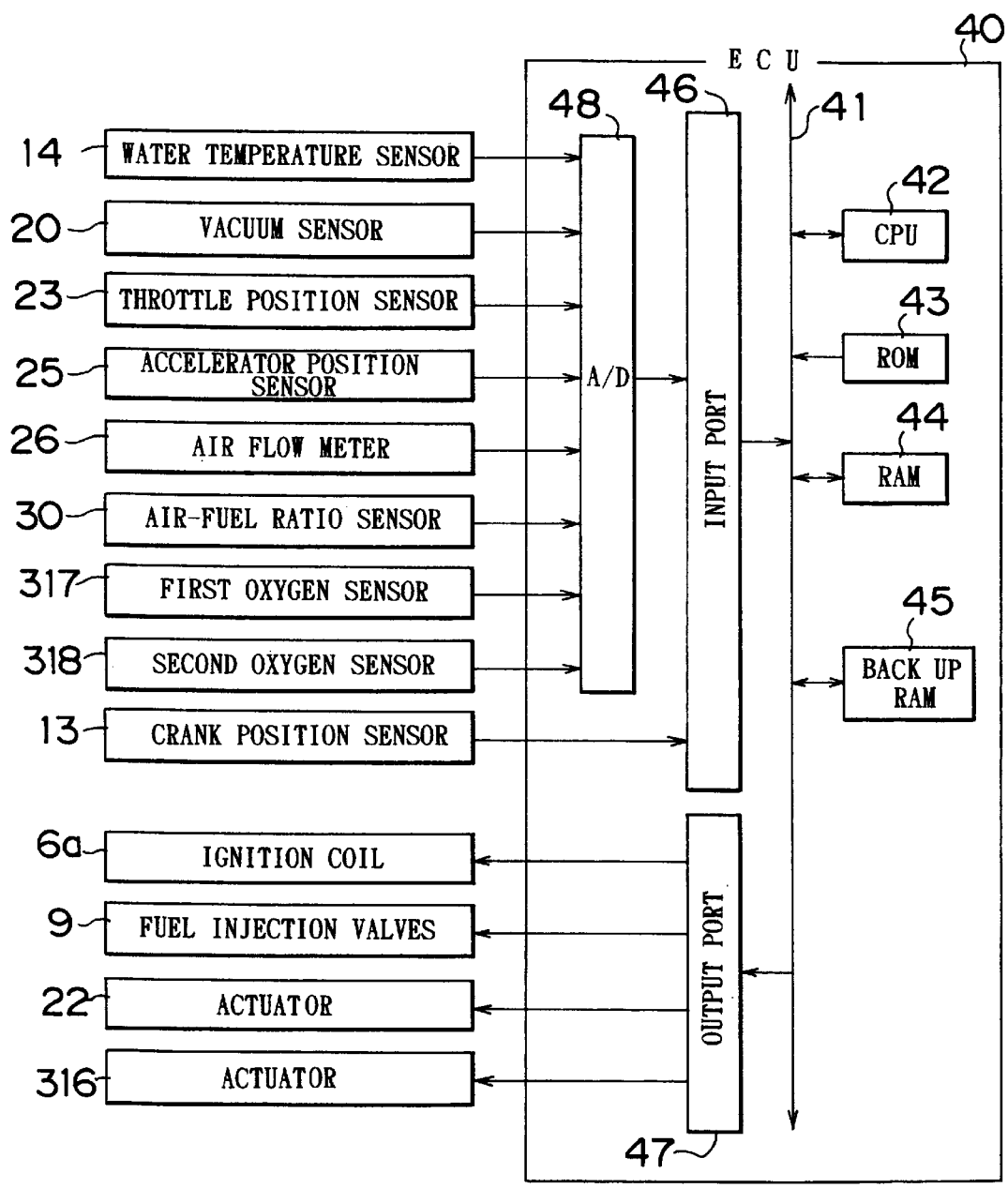
FIG. 8 is a block diagram illustrating the internal construction of an ECU according to the second embodiment.

As indicated in FIG. 8, the second oxygen sensor 318 is connected to an A/D converter 48 of an ECU 40 by an electric wiring. An output signal of the second oxygen sensor 318 is input to a CPU 42 or to a RAM 44 via the A/D converter 48 and an input port 46.

The CPU 42 of the ECU 40 performs diagnosis on the adsorbent 312 based on the value of the output signal of the second oxygen sensor 318. More specifically, the CPU 42 calculates a total of the value of the output signal of the second oxygen sensor 318 during a predetermined diagnostic time T on condition that: (1) the adsorbent 3 12 is in a state in which the adsorbent 312 should be releasing unburned gas components and (2) the air-fuel ratio feedback control is being executed.

Figure 9:
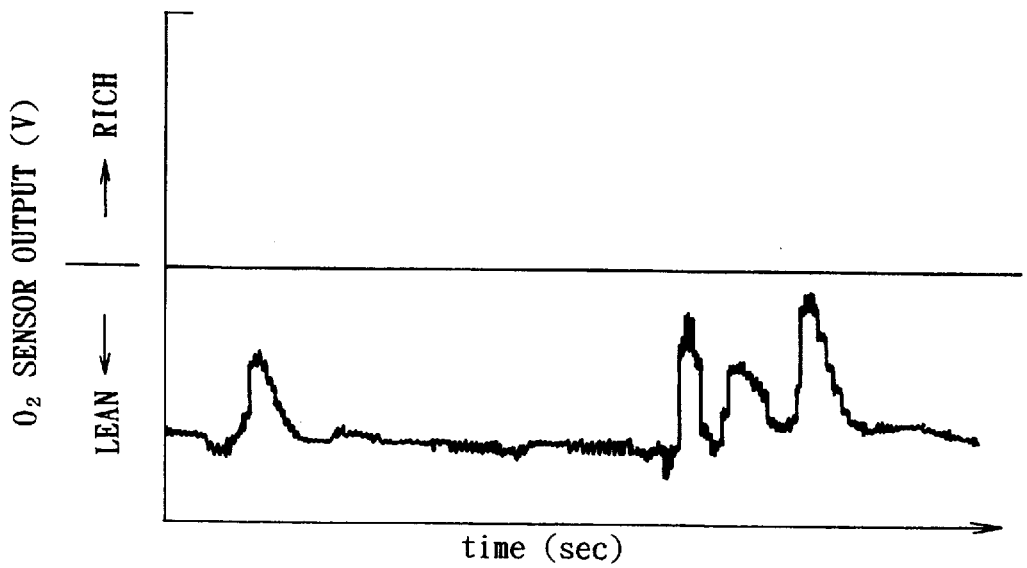
FIG. 9 is diagram illustrating an example of the signal output by a second oxygen sensor when the adsorbent is normal.

The air-fuel ratio feedback control is performed on the basis of the output signal of the first oxygen sensor 317 as in the first embodiment. Therefore, when the adsorbent 312 is normal, the control is performed so that the air-fuel ratio of exhaust gas flowing downstream of the adsorbent 312, that is, exhaust gas containing unburned gas components released from the adsorbent 312, becomes equal to a target air-fuel ratio, and so that the air-fuel ratio of exhaust gas flowing upstream of the adsorbent 312 (i.e., the air-fuel ratio of exhaust gas not containing unburned gas components released from the adsorbent 312) shifts from the target air-fuel ratio set in conjunction with the first oxygen sensor 317 to the lean side by a deviation corresponding to the amount of unburned gas components released from the adsorbent 312. As a result, the signal output by the second oxygen sensor 318 when the adsorbent 312 is normal exhibits a waveform as shown in FIG. 9.

Figure 10:
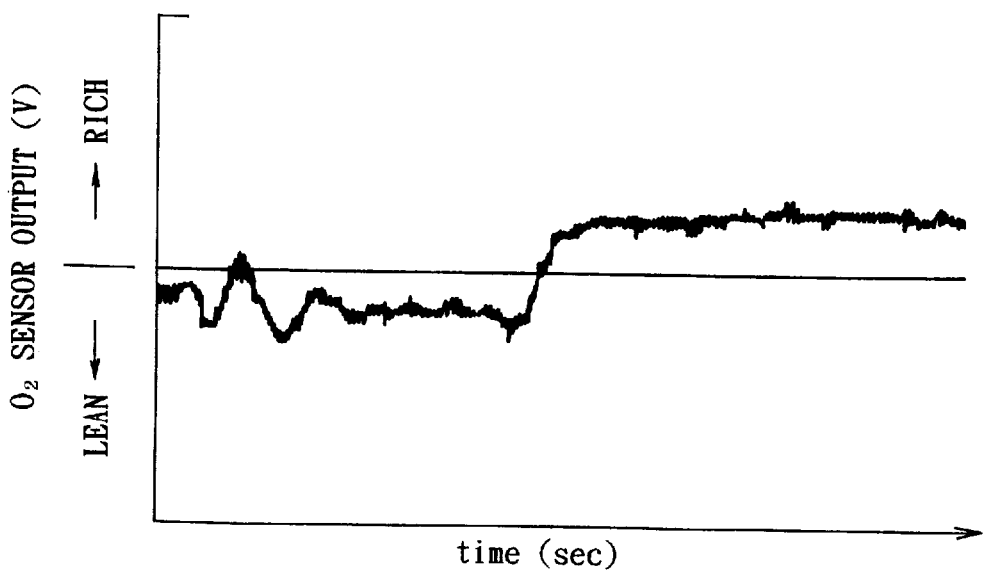
FIG. 10 is a diagram illustrating an example of the signal output by the second oxygen sensor when the adsorbent is abnormal.

If the adsorbent 312 fails to normally adsorb unburned gas components during a cold state, or if the adsorbent 312 fails to normally release unburned gas components during a desorption process, unburned gas components will not be released from the adsorbent 312 even when the adsorbent 312 is in a state in which the adsorbent 312 is supposed to be releasing unburned gas components. Therefore, the air-fuel ratio of exhaust gas upstream of the adsorbent 312 will not exhibit a lean-side deviation corresponding to the amount of unburned gas components supposed to be released from the adsorbent 312. As a result, when the adsorbent 312 has an abnormality, the output signal of the second oxygen sensor 318 exhibits a waveform as shown in FIG. 10.

Therefore, provided that the adsorbent 312 is in the state in which the adsorbent 312 should be releasing unburned gas components and the air-fuel ratio feedback control is being executed, it is possible to determine that the adsorbent 312 is normal if the output voltage ($V_2$) of the second oxygen sensor 318 is lower than the reference voltage $V_{REF}$ and the difference therebetween (corresponding to the generally termed lean correction amount) is equal to or greater than a predetermined value (a value corresponding to the amount of unburned gas components that are supposed to be releasing from the adsorbent 312), and to determine that the adsorbent 312 is abnormal if the difference is less than the predetermined value.

However, since the exhaust air-fuel ratio randomly varies depending on the operating condition of the internal combustion engine 1, there is a possibility of a false determination if the diagnosis is solely based on a temporary exhaust air-fuel ratio. In this embodiment, therefore, a total value (V) of the output voltage ($V_2$) of the second oxygen sensor 318 in the predetermined diagnostic time T is calculated. If the total value (V) is equal to or less than a predetermined criterion value (e.g., a total value of the output voltage ($V_2$) of the second oxygen sensor 318 in the predetermined diagnostic time T determined on the assumption that the output voltage ($V_2$) remains constant at the reference voltage $V_{REF}$), it is determined that the adsorbent 312 is normal. If the total value (V) is greater than the criterion value, it is determined that the adsorbent 312 is abnormal.

In this manner, the CPU 42 executes application programs stored in the ROM 43, thereby realizing a diagnostic device of this embodiment of the invention. The diagnosis according to this embodiment will be described.

Figure 11:
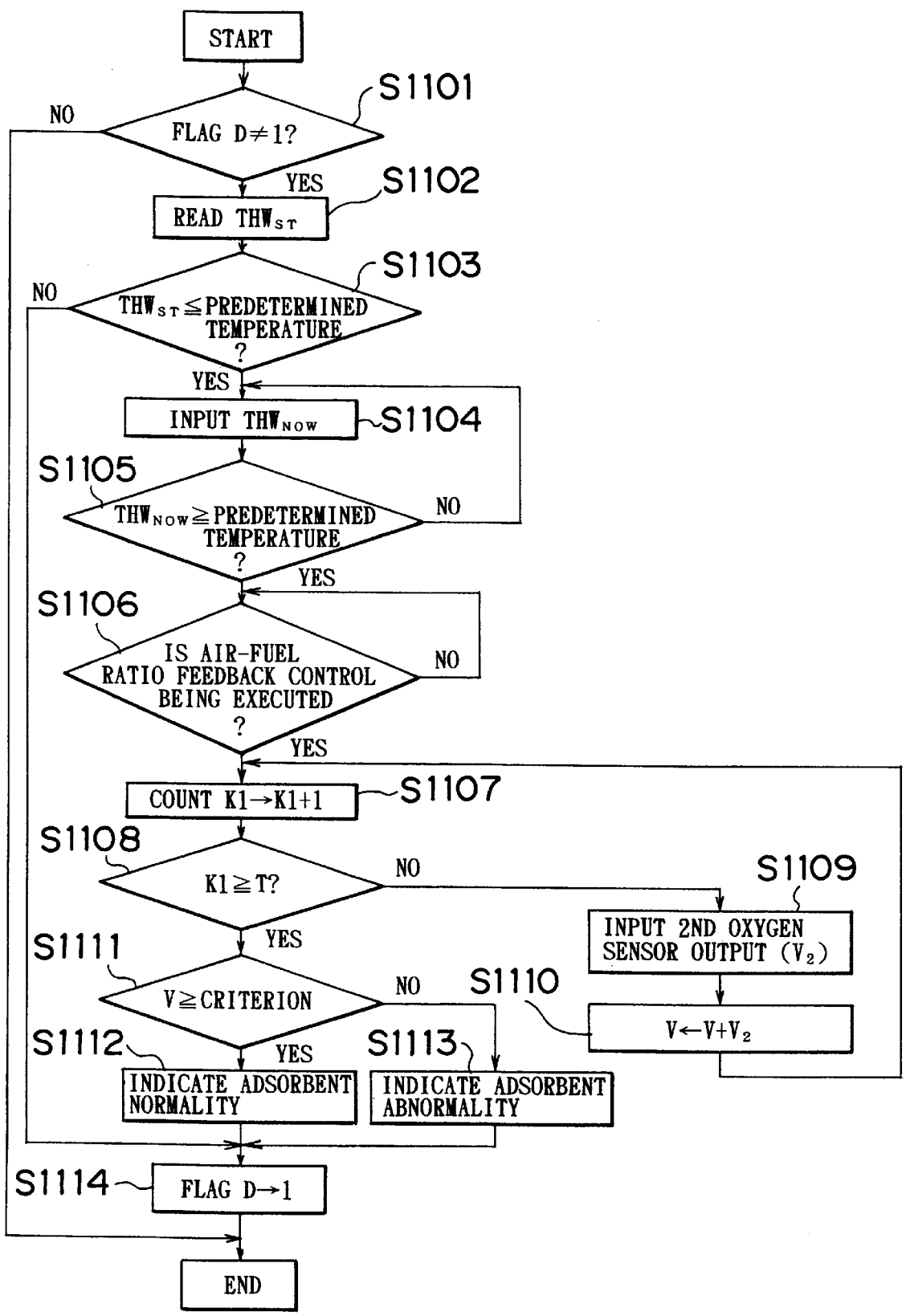
FIG. 11 is a flowchart illustrating a diagnostic control routine according to the second embodiment.

FIG. 11 illustrates a diagnostic control routine according to this embodiment. The diagnostic control routine is repeatedly executed at every predetermined time.

In the diagnostic control routine, the CPU 42 determines in step S1101 whether "1" has been stored in the diagnosis end flag (FLAG D) storing area of the RAM 44. If it is determined in step S1101 that "1" has been stored in the diagnosis end flag (FLAG D) storing area of the RAM 44, the CPU 42 ends the execution of the routine, assuming that the diagnosis of the adsorbent 312 has already finished. If it is determined in step S1101 that "1" has not been stored in the diagnosis end flag (FLAG D) storing area of the RAM 44, the CPU 42 assumes that the diagnosis of the adsorbent 312 has not finished, and proceeds to step S1102.

In step S1102, the CPU 42 reads the startup cooling water temperature $THW_{ST}$ from the RAM 44. Subsequently in step S1103, the CPU 42 determines whether the startup cooling water temperature $THW_{ST}$ read out in step S1102 is equal to or lower than a predetermined temperature.

If it is determined in step S1103 that the startup cooling water temperature $THW_{ST}$ is higher than the predetermined temperature, the CPU 42 proceeds to step S1114, and assumes that the internal combustion engine 1 was warm-started and, therefore, the three-way catalyst device 310 was in the active state at the time of startup, so that a control for causing unburned exhaust gas components to adsorb to the adsorbent 312 (i.e., a control of causing the entire amount of exhaust gas to flow through the bypass passage 311 by maintaining the completely closed state of the open-close valve 315 in the emission control mechanism 31) has not been performed, that is, unburned gas components have not been adsorbed to the adsorbent 312. In step S1114, the CPU 42 stores "1" into the diagnosis end flag (FLAG D) storing area of the RAM 44. Subsequently, the CPU 42 ends the execution of the routine.

Conversely, if it is determined in step S1103 that the startup cooling water temperature $THW_{ST}$ is equal to or lower than the predetermined temperature, the CPU 42 proceeds to step S1104, and assumes that the internal combustion engine 1 was cold-started and, therefore, the three-way catalyst device 310 was in the inactive state at the time of startup, so that the passage switching control of the emission control mechanism 31 for causing unburned gas components to adsorb to the adsorbent 312 (i.e., the control of causing the entire amount of exhaust gas to flow through the bypass passage 311 by maintaining the completely closed state of the open-close valve 315 in the emission control mechanism 31) was performed during the period between the startup of the internal combustion engine 1 and the activation of the three-way catalyst device 310, that is, unburned gas components have been adsorbed to the adsorbent 312.

In step S1104, the CPU 42 receives the present value ($THW_{NOW}$) of the output signal of the water temperature sensor 14. Subsequently in step S1105, the CPU 42 determines whether the present cooling water temperature $THW_{NOW}$ is equal to or higher than a predetermined temperature. If it is determined in step S1105 that the present cooling water temperature $THW_{NOW}$ is lower than the predetermined temperature, the CPU 42 estimates that the temperature of the adsorbent 312 is lower than the desorption temperature, and repeats the processing of steps S1104 and S1105 until the present cooling water temperature $THW_{NOW}$ reaches or exceeds the predetermined temperature.

When it is determined in step S1105 that the present cooling water temperature $THW_{NOW}$ is equal to or higher than the predetermined temperature, the CPU 42 estimates that the temperature of the adsorbent 312 is equal to or higher than the desorption temperature, and proceeds to step S1106.

In step S1106, the CPU 42 determines whether the air-fuel ratio feedback control is being performed. If it is determined in step S1106 that the air-fuel ratio feedback control is not being performed, the CPU 42 repeats the processing of step S1106 until the air-fuel ratio feedback control is performed.

When it is determined in step S1106 that the air-fuel ratio feedback control is being performed, the CPU 42 proceeds to step S1107. Instep S1107, the CPU 42 increments the count $K_1$ stored in the diagnostic time count ($K_1$) storing area of the RAM 44 by "1".

Subsequently in step S1108, the CPU 42 determines whether the count $K_1$ incremented in step S1107 has reached or exceeded a predetermined diagnostic time T (a fixed value). If it is determined in step S1108 that the count $K_1$ is less than the predetermined diagnostic time T, the CPU 42 proceeds to step S1109, in which the CPU 42 receives an output voltage ($V_2$) of the second oxygen sensor 318. Subsequently in step S1110, the CPU 42 reads out the total value (V) obtained in the previous cycle, and adds the output voltage ($V_2$) of the second oxygen sensor 318 input in step S1109 to the total value (V) to determine a new total value (V). The CPU 42 stores the new total value (V) into a predetermined area in the RAM 44. After executing step S1110, the CPU 42 returns to step S1107.

When it is determined in step S1108 that the count $K_1$ has reached or exceeded the predetermined diagnostic time T, the CPU 42 proceeds to step S1111. In step S1111, the CPU 42 reads the total value (V) from the predetermined area in the RAM 44, and determines whether the total value (V) is equal to or less than a criterion value.

If it is determined in step S1111 that the total value (V) is equal to or less than the criterion value, the CPU 42 proceeds to step S1112, and assumes that the adsorbent 312 is normal. In step S1112, the CPU 42 stores data indicating that the adsorbent 312 is normal into a predetermined area in the backup RAM 45.

Conversely, if it is determined in step S1111 that the total value (V) is greater than the criterion value, the CPU 42 proceeds to step S1113, and assumes that the adsorbent 312 is abnormal. In step S1113, the CPU 42 stores data indicating that the adsorbent 312 is abnormal into the predetermined area in the backup RAM 45.

After executing step S1112 or S1113, the CPU 42 proceeds to step S1114, in which the CPU 42 sets "1" in the diagnosis end flag (FLAG D) storing area of the RAM 44. Subsequently, the CPU 42 ends the execution of the routine.

The above-described embodiment performs the diagnosis of the adsorbent 312 based on the air-fuel ratio of exhaust gas upstream of the adsorbent 312. Therefore, the embodiment prevents a false determination caused by fluctuation of the amount of unburned gas components released from the adsorbent 312, thereby achieving high-precision diagnosis.

Although the embodiment performs the diagnosis based on the total value of the output voltage ($V_2$) of the second oxygen sensor 318 in the predetermined diagnostic time T, the diagnosis may also be performed based on a mean value of the output voltages ($V_2$) of the second oxygen sensor 318 in the predetermined diagnostic time T.

The diagnosis may also be performed by using an air-fuel ratio feedback correction factor (FAF) that is used as an air-fuel ratio correction amount in the air-fuel ratio feedback control, instead of using the value of the output signal of the second oxygen sensor 318. The diagnosis may also be based on a skip amount or an integral of the air-fuel ratio feedback correction factor (FAF).

Although the embodiment uses a concentration cell type oxygen sensor as an air-fuel ratio detecting device disposed downstream of the adsorbent, it is also possible to use an air-fuel ratio sensor formed by a limit current type oxygen sensor. The oxygen sensor for detecting the oxygen concentration in exhaust gas may be replaced by a HC sensor that detects the amount of a fuel component in exhaust gas. Furthermore, although the embodiment uses an oxygen sensor as an air-fuel ratio detecting device disposed upstream of the adsorbent, the oxygen sensor may be replaced by an air-fuel ratio sensor. The air-fuel ratio sensor 30 disposed upstream of the three-way catalyst device 28 may also be used to perform the function of the upstream air-fuel ratio detecting device.

As for a downstream air-fuel ratio detecting device, it is also possible to provide an air-fuel ratio sensor downstream of the three-way catalyst device 310 instead of employing the oxygen sensor 317 disposed upstream of the three-way catalyst device 310.

As for the air-fuel ratio feedback control, it is also possible to adopt a control based on a generally termed double $O_2$ sensor system wherein a sub-feedback control (a control of correcting the air-fuel ratio correction factor (FAF) used in the main feedback control) is performed based on the output signal of the oxygen sensor 317 located downstream of the three-way catalyst device 28 and downstream of the adsorbent 312.

The adsorbent diagnostic apparatus of the invention diagnoses a fault or deterioration of the adsorbent based at least on the air-fuel ratio of exhaust gas downstream of the adsorbent at a timing at which the adsorbent should be releasing unburned gas components and at which the flow of unburned gas components from the adsorbent to the site of the air-fuel ratio detecting device is stabilized. Therefore, the air-fuel ratio of exhaust gas downstream of the adsorbent does not deviate from the detectable range of the air-fuel ratio detecting device, so that precise diagnosis can be performed.

Furthermore, the adsorbent diagnostic apparatus of the invention diagnoses a fault or deterioration of the adsorbent based on the value of a signal output from the air-fuel ratio detecting device when the adsorbent should be releasing unburned gas components and the air-fuel ratio feedback control of the internal combustion engine is being performed. Therefore, considerable fluctuations of the exhaust air-fuel ratio caused by variations of the operating condition of the internal combustion engine are controlled, so that the air-fuel ratio of exhaust gas downstream of the adsorbent changes only within the detectable range of the air-fuel ratio detecting device. Hence, the adsorbent diagnostic apparatus is able to perform accurate diagnosis.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An adsorbent diagnostic apparatus that diagnoses an adsorbent provided in an exhaust passage of an internal combustion engine, the adsorbent adsorbing an unburned gas component in exhaust gas when a temperature of the adsorbent is lower than a predetermined temperature, and the adsorbent releasing previously adsorbed unburned gas component when the temperature of the adsorbent is equal to or higher than the predetermined temperature, the apparatus comprising:

an air-fuel ratio detector provided in a portion of the exhaust passage downstream of the adsorbent, the air-fuel ratio detector detecting an air-fuel ratio of exhaust gas flowing in the exhaust passage; and a controller that determines whether the adsorbent has at least one of a fault or a deterioration, based on a detection value of the air-fuel ratio detected by the air-fuel ratio detector, only when a condition exists in which the adsorbent should be releasing a substantially constant amount of the unburned gas component.

2. An adsorbent diagnostic apparatus according to claim 1, wherein the air-fuel ratio detector is a first air-fuel ratio detector, and further comprising a second air-fuel ratio detector provided in a portion of the exhaust passage upstream of the adsorbent, wherein the controller determines whether the adsorbent has at least one of a fault or a deterioration, based on the detection value detected by the first air-fuel ratio detector and a detection value detected by the second air-fuel ratio detector.

3. An adsorbent diagnostic apparatus according to claim 1, wherein the controller determines whether the adsorbent has at least one of a fault or a deterioration, based on a frequency with which the detection value of the air-fuel ratio detected by the air fuel ratio detector switches between a fuel-lean side of a predetermined air-fuel ratio and a fuel-rich side of the predetermined air-fuel ratio.

4. An adsorbent diagnostic apparatus according to claim 1, wherein the controller determines whether the adsorbent has at least one of a fault or a deterioration, based on a magnitude of an amplitude of oscillatory variation of the detection value of the air-fuel ratio detected by the air-fuel ratio detector.

5. An adsorbent diagnostic apparatus according to claim 1, wherein the controller determines whether the adsorbent has at least one of a fault or a deterioration without detecting the air-fuel ratio in any portions of the exhaust passage located downstream of a catalyst that removes the unburned gas component released from the adsorbent.

6. An adsorbent diagnostic apparatus that diagnoses an adsorbent provided in an exhaust passage of an internal combustion engine, the adsorbent adsorbing an unburned gas component in exhaust gas when a temperature of the adsorbent is lower than a predetermined temperature, and the adsorbent releasing previously adsorbed unburned gas component when the temperature of the adsorbent is equal to or higher than the predetermined temperature, the apparatus comprising:

an air-fuel ratio detector provided in a portion of the exhaust passage downstream of the adsorbent, the air-fuel ratio detector detecting an air-fuel ratio of exhaust gas flowing in the exhaust passage; and a controller that performs a feedback control of the air-fuel ratio of the internal combustion engine so that the air-fuel ratio of exhaust gas flowing downstream of the adsorbent becomes a predetermined air-fuel ratio, based on a detection value of the air-fuel ratio detected by the air-fuel ratio detector, the controller determining whether the adsorbent has at least one of a fault or a deterioration, based on the detection value of the air-fuel ratio detected by the air-fuel ratio detector, when a condition exists in which the adsorbent should be releasing the previously adsorbed unburned gas component and the air-fuel ratio of the internal combustion engine is being feedback-controlled.

7. An adsorbent diagnostic apparatus according to claim 6, wherein the controller determines whether the adsorbent has at least one of a fault and a deterioration, based on an air-fuel ratio correction amount related to the feedback control of the air-fuel ratio.

8. An adsorbent diagnostic apparatus according to claimed wherein the air-fuel ratio detector is a first air-fuel ratio detector, and further comprising a second air-fuel ratio detector provided in a portion of the exhaust passage upstream of the adsorbent, wherein the controller feedback-controls the air-fuel ratio of the internal combustion engine, based on the detection value detected by the first air-fuel ratio detector and a detection value detected by the second air-fuel ratio detector.

9. An adsorbent diagnostic apparatus according to claim 6, wherein the air-fuel ratio detector is a first air-fuel ratio detector, and further comprising a second air-fuel ratio detector provided in a portion of the exhaust passage upstream of the adsorbent wherein the controller determines whether the adsorbent has at least one of a fault or a deterioration, based on the detection value detected by the first air-fuel ratio detector and a detection value detected by the second air-fuel ratio detector.

10. An adsorbent diagnostic apparatus according to claim 6, wherein the controller determines whether the adsorbent has at least one of a fault or a deterioration, based on a frequency with which the detection value of the air-fuel ratio detected by the air-fuel ratio detector switches between a fuel-lean side of a predetermined air-fuel ratio and a fuel-rich side of the predetermined air-fuel ratio.

11. An adsorbent diagnostic apparatus according to claim 6, wherein the controller determines whether the adsorbent has at least one of a fault or a deterioration, based on a magnitude of an amplitude of oscillatory variation of the detection value of the air-fuel ratio detected by the air-fuel ratio detector.

12. An adsorbent diagnostic method for diagnosing an adsorbent provided in an exhaust passage of an internal combustion engine, the adsorbent adsorbing an unburned gas component in exhaust gas when a temperature of the adsorbent is lower than a predetermined temperature and releasing previously adsorbed unburned gas component when the temperature of the adsorbent is equal to or higher than the predetermined temperature, the method comprising:

detecting an air-fuel ratio of exhaust gas flowing through a portion of the exhaust passage downstream of the adsorbent;

causing a substantially constant amount of the unburned gas component to be released from the adsorbent into the portion of the exhaust passage downstream of the adsorbent; and determining whether the adsorbent has at least one of a fault or a deterioration, based on a detection value of the air-fuel ratio detected in the portion of the exhaust passage downstream of the adsorbent, only when the substantially constant amount of the unburned gas component is caused to be released from the adsorbent.

13. An adsorbent diagnostic method according to claim 12, further comprising detecting an air-fuel ratio of exhaust gas flowing through a portion of the exhaust passage upstream of the adsorbent, wherein the determination as to whether the adsorbent has at least one of a fault or a deterioration is made, based on the detection value of the air-fuel ratio detected downstream of the adsorbent and a detection value of the air-fuel ratio detected upstream of the adsorbent.

14. An adsorbent diagnostic method according to claim 12, wherein the determination as to whether the adsorbent has at least one of a fault or a deterioration is made, based on a frequency with which the detection value of the air-fuel ratio detected downstream of the adsorbent switches between a fuel-lean side of a predetermined air-fuel ratio and a fuel-rich side of the predetermined air-fuel ratio.

15. An adsorbent diagnostic method according to claim 12, wherein the determination as to whether the adsorbent has at least one of a fault or a deterioration is made, based on a magnitude of an amplitude of oscillatory variation of the detection value of the air-fuel ratio detected downstream of the adsorbent.

16. An adsorbent diagnostic method for diagnosing an adsorbent provided in an exhaust passage of an internal combustion engine the adsorbent adsorbing an unburned gas component in exhaust gas when a temperature of the adsorbent is lower than a predetermined temperature and releasing previously adsorbed unburned gas component when the temperature of the adsorbent is equal to or higher than the predetermined temperature, the method comprising:

detecting an air-fuel ratio of exhaust gas flowing through a portion of the exhaust passage downstream of the adsorbent;

performing a feedback control of the air-fuel ratio of the internal combustion engine so that the air-fuel ratio of exhaust gas flowing downstream of the adsorbent becomes a predetermined air-fuel ratio, based on a detection value of the air-fuel ratio detected downstream of the adsorbent; and determining whether the adsorbent has at least one of a fault or a deterioration, based on the detection value of the air-fuel ratio detected downstream of the adsorbent, when a condition exists in which the adsorbent should be releasing the unburned gas component and the air-fuel ratio of the internal combustion engine is being feedback-controlled.

17. An adsorbent diagnostic method according to claim 16, wherein the determination as to whether the adsorbent has one of a fault and a deterioration is made, based on an air-fuel ratio correction amount related to the feedback control of the air-fuel ratio.

18. An adsorbent diagnostic method according to claim 16, further comprising detecting an air-fuel ratio of exhaust gas flowing through a portion of the exhaust passage upstream of the adsorbent, wherein the determination as to whether the adsorbent has at least one of a fault or a deterioration is made, based on the detection value of the air-fuel ratio detected downstream of the adsorbent and a detection value of the air-fuel ratio detected upstream of the adsorbent.

19. An adsorbent diagnostic method according to claim 16, further comprising detecting an air-fuel ratio of exhaust gas flowing through a portion of the exhaust passage upstream of the adsorbent, wherein the air-fuel ratio of the internal combustion engine is feedback-controlled, based on the detection value of the air-fuel ratio detected downstream of the adsorbent and a detection value of the air-fuel ratio detected upstream of the adsorbent.

20. An adsorbent diagnostic method according to claim 16, wherein the determination as to whether the adsorbent has at least one of a fault or a deterioration is made, based on a frequency with which the detection value of the air-fuel ratio detected downstream of the adsorbent switches between a fuel-lean side of a predetermined air-fuel ratio and a fuel-rich side of the predetermined air-fuel ratio.

21. An adsorbent diagnostic method according to claim 16, wherein the determination as to whether the adsorbent has at least one of a fault or a deterioration is made, based on a magnitude of an amplitude of oscillatory variation of the detection value of the air-fuel ratio detected downstream of the adsorbent.

22. An adsorbent diagnostic apparatus according to claim 6, wherein the controller determines whether the adsorbent has at least one of a fault or a deterioration without detecting the air-fuel ratio in any portions of the exhaust passage located downstream of a catalyst that removes the unburned gas component released from the adsorbent.

23. An adsorbent diagnostic method according to claim 12, wherein the step of determining whether the adsorbent has at least one of a fault or a deterioration is made without detecting the air-fuel ratio in any portions of the exhaust passage located downstream of a catalyst that removes the unburned gas component released from the absorbent.

24. An adsorbent diagnostic method according to claim 16, wherein the step of determining whether the adsorbent has at least one of a fault or a deterioration is made without detecting the air-fuel ratio in any portions of the exhaust passage located downstream of a catalyst that removes the unburned gas component released from the absorbent.

* * * * *